US006259706B1

(12) United States Patent
Shimada

(10) Patent No.: US 6,259,706 B1
(45) Date of Patent: Jul. 10, 2001

(54) COMMUNICATION CONTROLLING APPARATUS AND RECORDING MEDIUM FOR RECORDING COMMUNICATION CONTROLLING PROGRAMS

(75) Inventor: Junichi Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/054,104

(22) Filed: Apr. 2, 1998

(30) Foreign Application Priority Data

Oct. 23, 1997 (JP) .................................... 9-290617

(51) Int. Cl.$^7$ ................ H04J 3/16; H04J 3/24; G06F 15/16
(52) U.S. Cl. ........................... 370/466; 709/228
(58) Field of Search .................... 370/400, 401, 370/402, 464, 465, 466, 469; 710/11; 709/228

(56) References Cited

U.S. PATENT DOCUMENTS

| 5,500,860 | * | 3/1996 | Perlman et al. | 370/401 |
| 5,586,117 | * | 12/1996 | Edem et al. | 370/466 |
| 5,883,894 | * | 3/1999 | Patel et al. | 370/438 |

FOREIGN PATENT DOCUMENTS

| 6-2137945 | 6/1987 | (JP) . |
| 2198049 | 8/1990 | (JP) . |
| 4235439 | 8/1992 | (JP) . |
| 7245636 | 9/1995 | (JP) . |

* cited by examiner

Primary Examiner—Huy D. Vu
Assistant Examiner—Kevin C. Harper
(74) Attorney, Agent, or Firm—Helfgott & Karas, PC

(57) ABSTRACT

A communication controlling apparatus includes a receiving side communication protocol identifying means for determining a candidate communication protocol for a second apparatus. If an acknowledgment response is received from the second apparatus, a communication protocol is determined to be a candidate communication protocol for the second apparatus and, if no acknowledgment response is received, operations to convert a first signal into another signal conforming to another communication protocol supposed to be adopted by the second apparatus and to transmit the other signal to the second apparatus are repeated till an acknowledgment response to the other signal is received from the second apparatus. The apparatus also has a communication protocol converting means converting the first signal into another signal conforming to another communication protocol supposed to be adopted by the second apparatus, and a communication protocol conversion controlling means controlling the communication protocol converting means. If a first communication protocol is different from a protocol at the receiving side, a command is given to the communication protocol converting means to convert the first signal into another signal conforming to the communication protocol identified by the protocol identifying means at the receiving side.

14 Claims, 12 Drawing Sheets

COMMUNICATION CONTROLLING APPARATUS AND RECORDING MEDIUM FOR RECORDING COMMUNICATION CONTROLLING PROGRAMS

BACKGROUND OF THE INVENTION

1. Field of the Invention

In general, the present invention relates to a communication controlling apparatus and a recording medium for recording communication controlling programs. More particularly, the present invention relates to communication protocol conversion in a data transmission system with a communication protocol on a transmitter side different from a communication protocol on a receiver side.

2. Description of the Related Art

In a data transmission system, data is exchanged among a plurality of communication apparatuses such as SDH (Synchronous Digital Hierarchy) apparatuses through a plurality of communication lines. Normally, an SDH apparatus is provided with a monitoring processing unit for monitoring hardware failures of a communication line interface unit performing the role of an interface between a terminal and a communication line and failures occurring in a received signal. In the event of a failure, alarm information is transmitted to an external monitoring apparatus in accordance with a predetermined communication protocol. Receiving the alarm information, the external monitoring apparatus notifies a person in charge of maintenance of the existence of the failure by outputting the alarm information to a display unit. The person in charge of maintenance then issues a variety of control commands to the communication apparatus through a control processing unit employed in the communication apparatus in order to enhance communication reliability.

With development of an information society going on in recent years, the size of a communication network built to connect communication apparatuses and the amount of data transmitted among the apparatuses through the network keep increasing and, at the same time, up-graded versions of hardware and software are often introduced for improving the functional aspect of each of the communication apparatuses.

As a result, interlocked with the upgrading of the communication apparatus, the monitoring and controlling functions of the external monitoring apparatus are also improved substantially. In some cases, a communication protocol between the communication apparatus and the external monitoring apparatus is also reconstructed.

However, the conventional communication apparatus has only a communication function designed for a fixed communication protocol for communicating with the external monitoring apparatus. As a result, the following problems have been raised.

(a) If a communication network includes communication apparatuses having different communication protocols used for communicating with an external monitoring apparatus, it is necessary to provide a plurality of external monitoring apparatuses to cope with the different communication protocols. As a result, not only does the cost of developing the external monitoring apparatuses rise, but it is also necessary for the user to prepare a plurality of external monitoring apparatuses. That is why the communication network becomes complicated and the cost of its development is skyrocketing.

(b) Even in the case of a communication network built to connect communication apparatuses having a certain communication protocol used for communicating with an external monitoring apparatus, in order to replace the communication apparatuses with those each having new functions and a different communication protocol, it is also necessary to change the external monitoring apparatus with one that keeps up with the new communication protocol. That is to say, it is impossible to replace only the communication apparatus by one having new functions with the external monitoring apparatus kept unchanged.

SUMMARY OF THE INVENTION

It is an object of the present invention to solve the problems described above by providing a data transmission system with a communication controlling apparatus which makes it possible to implement a network configuration wherein communication apparatuses having different communication protocols used for communicating with an external monitoring apparatus can coexist with the existing external monitoring apparatus remaining unchanged as it is.

In accordance with an aspect of the present invention, there is provided a communication controlling apparatus provided between a first apparatus on a transmitting side originally designed for transmitting a first signal in accordance with a first communication protocol to a second apparatus on a receiving side for receiving a second signal in accordance with a second communication protocol and the second apparatus, wherein an acknowledgment response to the second signal is returned to the first apparatus if the second signal is received normally, and used for converting the first signal into the second signal conforming to the second communication protocol, the communication controlling apparatus comprising: receiving side communication protocol identifying means for determining a candidate communication protocol for the second apparatus wherein, if an acknowledgment response to the second signal transmitted to the second apparatus is received from the second apparatus, a communication protocol used for the transmission of the second signal to the second apparatus is determined to be a candidate communication protocol for the second apparatus and, if no acknowledgment response to the second signal transmitted to the second apparatus is received from the second apparatus, on the other hand, operations to convert the first signal into another signal conforming to another communication protocol supposed to be adopted by the second apparatus and to transmit the other signal to the second apparatus in accordance with the other communication protocol are repeated till an acknowledgment response to the other signal is received from the second apparatus in which case the other communication protocol is determined to be a candidate communication protocol for the second apparatus; communication protocol converting means for converting the first signal into another signal conforming to another communication protocol supposed to be adopted by the second apparatus; and communication protocol conversion controlling means for controlling the communication protocol converting means wherein, if the first communication protocol is different from a communication protocol identified by the receiving side communication protocol identifying means, a command is given to the communication protocol converting means to convert the first signal into another signal conforming to the communication protocol identified by the receiving side communication protocol identifying means and, if the first communication protocol matches a communication protocol identified by the receiving side communication protocol identifying means, on the other hand, the first signal is passed on to the second apparatus as it is.

The above and other objects, features as well as many of the attendant advantages of the present invention will become readily appreciated and the manner of realizing them will become more apparent as the same becomes better understood from a study of the following detailed description of some preferred embodiments and appended claims when considered in connection with accompanying diagrams showing the embodiments.

BRIEF DESCRIPTION OF THE DRAWINGS

Some preferred embodiments of the present invention are described in detail with reference to the following diagrams wherein.

DESCRIPTION OF THE PREFERRED EMBODIMENTS

Figure 1:
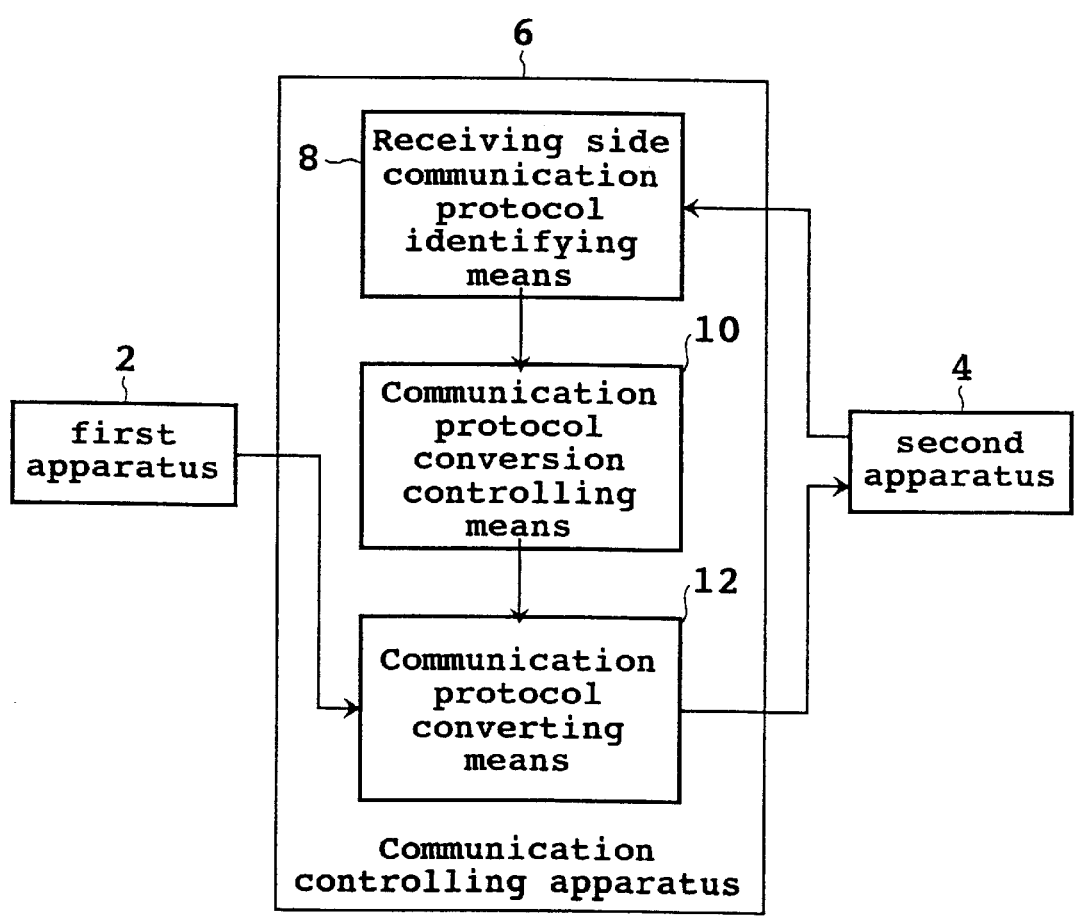
FIG. 1 is a diagram showing the principle of the present invention.

FIG. 1 is a diagram showing the principle of the present invention. As shown in the figure, a communication controlling apparatus 6 is provided between a first apparatus 2 on a transmitting side originally designed for transmitting a first signal in accordance with a first communication protocol to a second apparatus 4 on a receiving side for receiving a second signal in accordance with a second communication protocol and the second apparatus 4 wherein an acknowledgment response to the second signal is returned to the first apparatus 2 if the second signal is received normally and is used for converting the first signal into the second signal conforming to the second communication protocol. The communication controlling apparatus 6 comprises:

receiving side communication protocol identifying means 8 for determining a candidate communication protocol for the second apparatus 4 wherein, if an acknowledgment response to the second signal transmitted to the second apparatus 4 is received from the second apparatus 4, a communication protocol used for transmission of the second signal to the second apparatus 4 is determined to be a candidate communication protocol for the second apparatus 4 and, if no acknowledgment response to the second signal transmitted to the second apparatus 4 is received from the second apparatus 4, on the other hand, operations to convert the first signal into another signal conforming to another communication protocol supposed to be adopted by the second apparatus 4 and to transmit the other signal to the second apparatus 4 in accordance with the other communication protocol are repeated till an acknowledgment response to the other signal is received from the second apparatus 4 in which case the other communication protocol is determined to be a candidate communication protocol for the second apparatus 4;

communication protocol converting means 12 for converting the first signal into another signal conforming to another communication protocol supposed to be adopted by the second apparatus 4; and communication protocol conversion controlling means 10 for controlling the communication protocol converting means 12 wherein, if the first communication protocol is different from a communication protocol identified by the receiving side communication protocol identifying means 8, a command is given to the communication protocol converting means 12 to convert the first signal into another signal conforming to the communication protocol identified by the receiving side communication protocol identifying means 8 and, if the first communication protocol matches a communication protocol identified by the receiving side communication protocol identifying means 8, on the other hand, the first signal is passed on to the second apparatus 4 as it is.

In the configuration described above, if an acknowledgment response to the second signal transmitted to the second apparatus 4 is received from the second apparatus 4, the receiving side communication protocol identifying means 8 determines a communication protocol used for transmission of the second signal to the second apparatus 4 to be a candidate communication protocol for the second apparatus 4 and, if no acknowledgment response to the second signal transmitted to the second apparatus 4 is received from the second apparatus 4, on the other hand, the receiving side communication protocol identifying means 8 repeats operations to convert the first signal into another signal conforming to another communication protocol supposed to be adopted by the second apparatus 4 and to transmit the other signal to the second apparatus 4 in accordance with the other communication protocol till an acknowledgment response to the other signal is received from the second apparatus 4 in which case the other communication protocol is determined to be a candidate communication protocol for the second apparatus 4. If the first communication protocol is different from a communication protocol identified by the receiving side communication protocol identifying means 8, the communication protocol conversion controlling means 10 gives a command to the communication protocol converting means 12 to convert the first signal into another signal conforming to the communication protocol identified by the receiving side communication protocol identifying means 8 and, if the first communication protocol matches a communication protocol identified by the receiving side communication protocol identifying means 8, on the other hand, the first signal is passed on to the second apparatus 4 as it is. As a result, the second apparatus 4 can receive a signal in accordance with the second communication protocol, allowing communication to be established between the first apparatus 2 and the second apparatus 4.

In addition, as an alternative, the communication controlling apparatus 6 may have a configuration comprising:

receiving side communication protocol identifying means 8 for determining a candidate communication protocol for the second apparatus 4 by transmitting its own communication protocol identifying signal for identifying the communication protocol of the second apparatus 4 to the second apparatus 4 on its own initiative wherein, if an acknowledgment response to the communication protocol identifying signal transmitted to the second apparatus 4 is received from the second apparatus 4, a communication protocol used for the transmission of the communication protocol identifying signal to the second apparatus 4 is determined to be a candidate communication protocol for the second apparatus 4 and, if no acknowledgment response to the communication protocol identifying signal transmitted to the second apparatus 4 is received from the second apparatus 4, on the other hand, an operation to transmit another communication protocol identifying signal to the second apparatus 4 is repeated till an acknowledgment response to the other communication protocol identifying signal is received from the second apparatus 4 in which case the communication protocol used for transmission of the other communication protocol identifying signal to the second apparatus 4 is determined to be a candidate communication protocol for the second apparatus 4;

communication protocol converting means 12 for converting the first signal into another signal conforming to another communication protocol supposed to be adopted by the second apparatus 4; and communication protocol conversion controlling means 10 for controlling the communication protocol converting means 12 wherein, if the first communication protocol is different from a communication protocol identified by the receiving side communication protocol identifying means 8, a command is given to the communication protocol converting means 12 to convert the first signal into another signal conforming to the communication protocol identified by the receiving side communication protocol identifying means 8 and, if the first communication protocol matches a communication protocol identified by the receiving side communication protocol identifying means 8, on the other hand, the first signal is passed on to the second apparatus 4 as it is.

In the alternative configuration described above, if an acknowledgment response to the communication protocol identifying signal transmitted to the second apparatus 4 is received from the second apparatus 4, the receiving side communication protocol identifying means 8 determines a communication protocol used for the transmission of the communication protocol identifying signal to the second apparatus 4 to be a candidate communication protocol for the second apparatus 4. As a result, the communication protocol adopted by the second apparatus 4 can be identified with an even higher degree of reliability.

It is desirable to have the communication controlling apparatus 6 embedded in the first apparatus 2 and connected to the second apparatus 4 by a connector that can be plugged in the second apparatus 4. As an alternative, the communication controlling apparatus 6 can be connected to the first and second apparatuses 2 and 4 by connectors that can be plugged therein. In addition, it is also desirable to have the communication protocol conversion controlling means 10 control the communication protocol converting means 12 by using a control signal for determining whether or not the first signal generated by the first apparatus 2 is to be converted into a signal conforming to the communication protocol adopted by the second apparatus 4.

With the scheme described above, when the existing second apparatus 4 is replaced by a new second apparatus 4 having a communication protocol different from that of the existing one, both the existing and new second apparatuses 4 are connected to the communication controlling apparatus and a second signal is transmitted to the existing second apparatus 4 till the communication protocol adopted by the new second apparatus 4 is identified. After the communication protocol adopted by the new second apparatus 4 has been identified, the existing second apparatus 4 can be removed and a second signal is transmitted to the new second apparatus 4 in accordance with the identified communication protocol of the new second apparatus 4.

In addition, the communication controlling apparatus 6 can be further provided with a transmitting side communication protocol identifying means for identifying the communication protocol adopted by a first apparatus 2 on the basis of a first signal transmitted by the first apparatus 2. In this case, the communication protocol converting means 12 is used for converting a communication protocol supposed to be adopted by any first apparatus 2 on the transmitting side into a communication protocol supposed to be adopted by any second apparatus 4 on the receiving side, allowing communication to take place between the first apparatus 2 and the second apparatus 4. Furthermore, it is desirable to have the communication controlling apparatus 6 provided with an insert window for inserting a recording medium from the outside of the communication controlling apparatus 6 and a processor. In such a configuration, the functions of the receiving side communication protocol identifying means 8, the communication protocol converting means 12 and the communication protocol conversion controlling means 10 are implemented by execution of a communication controlling program stored in the recording medium by means of the processor. The configuration allows the communication controlling program to be changed without halting the first apparatus 2 and the second apparatus 4.

To put it in detail, it is desirable to provide a communication controlling apparatus 6 with a configuration wherein a recording medium is used for storing a communication controlling program to be executed by a processor for implementing functions of:

receiving side communication protocol identifying means 8 for determining a candidate communication protocol for the second apparatus 4 wherein, if an acknowledgment response to the second signal transmitted to the second apparatus 4 is received from the second apparatus 4, a communication protocol used for transmission of the second signal to the second apparatus 4 is determined to be a candidate communication protocol for the second apparatus 4 and, if no acknowledgment response to the second signal transmitted to the second apparatus 4 is received from the second apparatus 4, on the other hand, operations to convert the first signal into another signal conforming to another communication protocol supposed to be adopted by the second apparatus 4 and to transmit the other signal to the second apparatus 4 in accordance with the other communication protocol are repeated till an acknowledgment response to the other signal is received from the second apparatus 4 in which case the other communication protocol is determined to be a candidate communication protocol for the second apparatus 4;

communication protocol converting means 12 for converting the first signal into another signal conforming to another communication protocol supposed to be adopted by the second apparatus 4; and communication protocol conversion controlling means 10 for controlling the communication protocol converting means 12 wherein, if the first communication protocol is different from a communication protocol identified by the receiving side communication protocol identifying means 8, a command is given to the communication protocol converting means 12 to convert the first signal into another signal conforming to the communication protocol identified by the receiving side communication protocol identifying means 8 and, if the first communication protocol matches a communication protocol identified by the receiving side communication protocol identifying means 8, on the other hand, the first signal is passed on to the second apparatus 4 as it is.

In addition, as an alternative, it is desirable to provide a communication controlling apparatus 6 with a configuration wherein a recording medium is used for storing a communication controlling program to be executed by a processor for implementing functions of:

receiving side communication protocol identifying means 8 for determining a candidate communication protocol for the second apparatus 4 by transmitting its own communication protocol identifying signal for identifying the communication protocol of the second apparatus 4 to the second apparatus 4 on its own initiative wherein, if an acknowledgment response to the communication protocol identifying signal transmitted to the second apparatus 4 is received from the second apparatus 4, a communication protocol used for the transmission of the communication protocol identifying signal to the second apparatus 4 is determined to be a candidate communication protocol for the second apparatus 4 and, if no acknowledgment response to the communication protocol identifying signal transmitted to the second apparatus 4 is received from the second apparatus 4, on the other hand, an operation to transmit another communication protocol identifying signal to the second apparatus 4 is repeated till an acknowledgment response to the other communication protocol identifying signal is received from the second apparatus 4 in which case the communication protocol used for transmission of the other communication protocol identifying signal to the second apparatus 4 is determined to be a candidate communication protocol for the second apparatus 4;

communication protocol converting means 12 for converting the first signal into another signal conforming to another communication protocol supposed to be adopted by the second apparatus 4; and communication protocol conversion controlling means 10 for controlling the communication protocol converting means 12 wherein, if the first communication protocol is different from a communication protocol identified by the receiving side communication protocol identifying means 8, a command is given to the communication protocol converting means 12 to convert the first signal into another signal conforming to the communication protocol identified by the receiving side communication protocol identifying means 8 and, if the first communication protocol matches a communication protocol identified by the receiving side communication protocol identifying means 8, on the other hand, the first signal is passed on to the second apparatus 4 as it is.

FIRST EMBODIMENT

Figure 2:
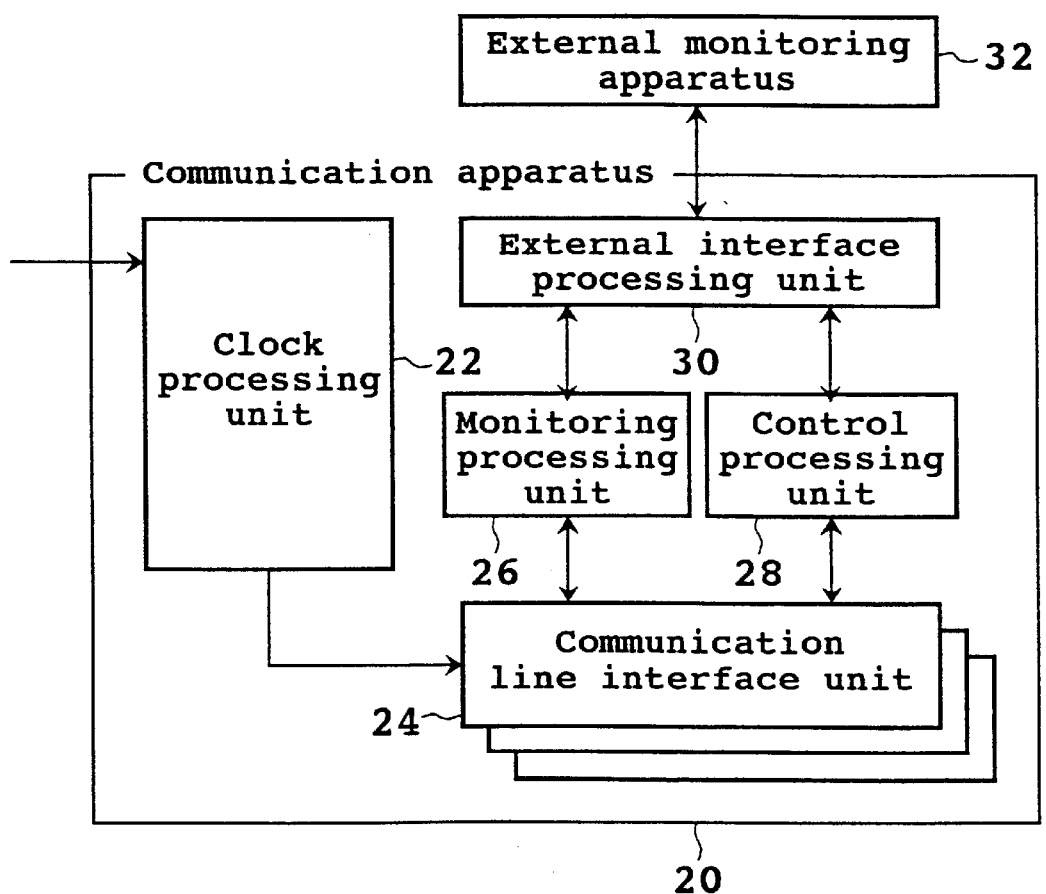
FIG. 2 is a diagram showing the configuration of a data transmission system comprising an external monitoring apparatus and a communication apparatus including a communication controlling apparatus implemented by a first embodiment of the present invention.

FIG. 2 is a diagram showing the configuration of a communication apparatus 20 including a communication controlling apparatus implemented by a first embodiment of the present invention as described above. The communication controlling apparatus provided by the first embodiment of the present invention is implemented as an external interface processing unit 30 employed in the communication apparatus 20 as shown in the figure. The communication apparatus 20 is typically a SDH apparatus which comprises a clock processing unit 22, a communication line interface unit 24, a monitoring processing unit 26 and a control processing unit 28 in addition to the external interface processing unit 30.

The clock processing unit 22 receives a clock signal supplied by an external clock generating circuit not shown in the figure and distributes the clock signal to the communication line interface unit 24, the monitoring processing unit 26, the control processing unit 28 and the external interface processing unit 30. The communication line interface unit 24 comprises a plurality of packages provided for interfaces such as a high speed communication line interface and a low speed communication line interface. Functions of the communication line interface unit 24 include relaying or multiplexing of principal signals to be transmitted as well as recognition of an operating state of a package employed therein as to which package is operating and detection of a principal signal failure and a hardware failure at a request made by the monitoring processing unit 26 besides notifying the monitoring processing unit 26 of alarming information on the failures. In addition, the communication line interface unit 24 carries out control processing for a package employed thereby in accordance with an instruction given by the control processing unit 28 and informs the control processing unit 28 of a result of the control processing.

The monitoring processing apparatus 26 monitors alarming states of the communication line interface 24 all the time and notifies an external monitoring apparatus 32 of the alarming states through the external interface processing unit 30 in accordance with a predetermined communication protocol. The control processing unit 28 carries out general control processing in the communication apparatus 20 in accordance with a control command received from the external monitoring apparatus 32 by way of the external interface processing unit 30 and transmits a result of the control processing to the external monitoring apparatus 32 through the external interface processing unit 30. The external interface processing unit 30 identifies a communication protocol adopted by the external monitoring unit 32 and, if the communication protocol adopted by the external monitoring unit 32 is found different from the communication protocol adopted by the communication apparatus 20 and a control signal generated by a dip switch or the like as will be described later indicates that communication protocol conversion is to be implemented, the external interface processing unit 30 converts monitoring information coming from the monitoring processing unit 26 or a result of control processing coming from the control processing unit 28 into data conforming to the communication protocol adopted by the external monitoring apparatus 32, and transmits the data resulting from the conversion to the external monitoring apparatus 32.

In addition, the external interface processing unit 30 receives a control command from the external monitoring apparatus 32 and, if necessary, converts the control command into a command conforming to the communication protocol adopted by the communication apparatus 20 before passing on the command to the control processing unit 28. It should be noted that a communication protocol adopted by the external monitoring unit 32 can be converted into a communication protocol adopted by the communication apparatus 20 by using the same technique as the conversion of the communication protocol adopted by the communication apparatus 20 into the communication protocol adopted by the external monitoring unit 32. It is assumed, however, that a control command is transmitted by the external monitoring apparatus 31 to the control processing unit 28 in accordance with the same communication protocol as that adopted by the communication apparatus 20 in the present embodiment. The monitoring processing unit 26 and the control processing unit 28 are each connected to the external interface processing unit 30 by an internal bus. On the other hand, the external interface processing unit 30 is connected to the external monitoring apparatus 32 by a predetermined physical interface through connectors. In addition, the external interface processing unit 30 can be connected to 2 external monitoring apparatuses 32, that is, the existing external monitoring apparatus 32 having a certain communication protocol and a new external monitoring apparatus 32 with a communication protocol different from the communication protocol of the existing external monitoring apparatus 32. The new external monitoring apparatus 32 is used for replacing the existing one after its new communication protocol has been identified by the external interface processing unit 30.

An external monitoring apparatus 32 comprises a plurality of functional layers. A physical layer prescribed by the physical interface is common to communication protocols adopted by all external monitoring apparatuses 32. A difference in communication protocol among external monitoring apparatuses 32, which is noticed at an upper layer higher than the physical layer, can be dealt with by software. The external monitoring apparatus 32 receives an alarm notification and monitoring information from the communication apparatus 20 monitored thereby and displays the alarm notification and the monitoring information on an output unit such as a CRT to a person in charge of maintenance. On the other hand, the external monitoring apparatus 32 receives a control command from the maintenance person and passes on the control command to the communication apparatus 20. The external monitoring apparatus 32 then receives a result of processing transmitted by the communication apparatus 20 in response to the control command and displays the result of processing on the output unit such as the CRT. The clock processing unit 22, the communication line interface unit 24, the monitoring processing unit 26, the control processing unit 28 and the external interface processing unit 30 are each implemented typically as a package.

Figure 3:
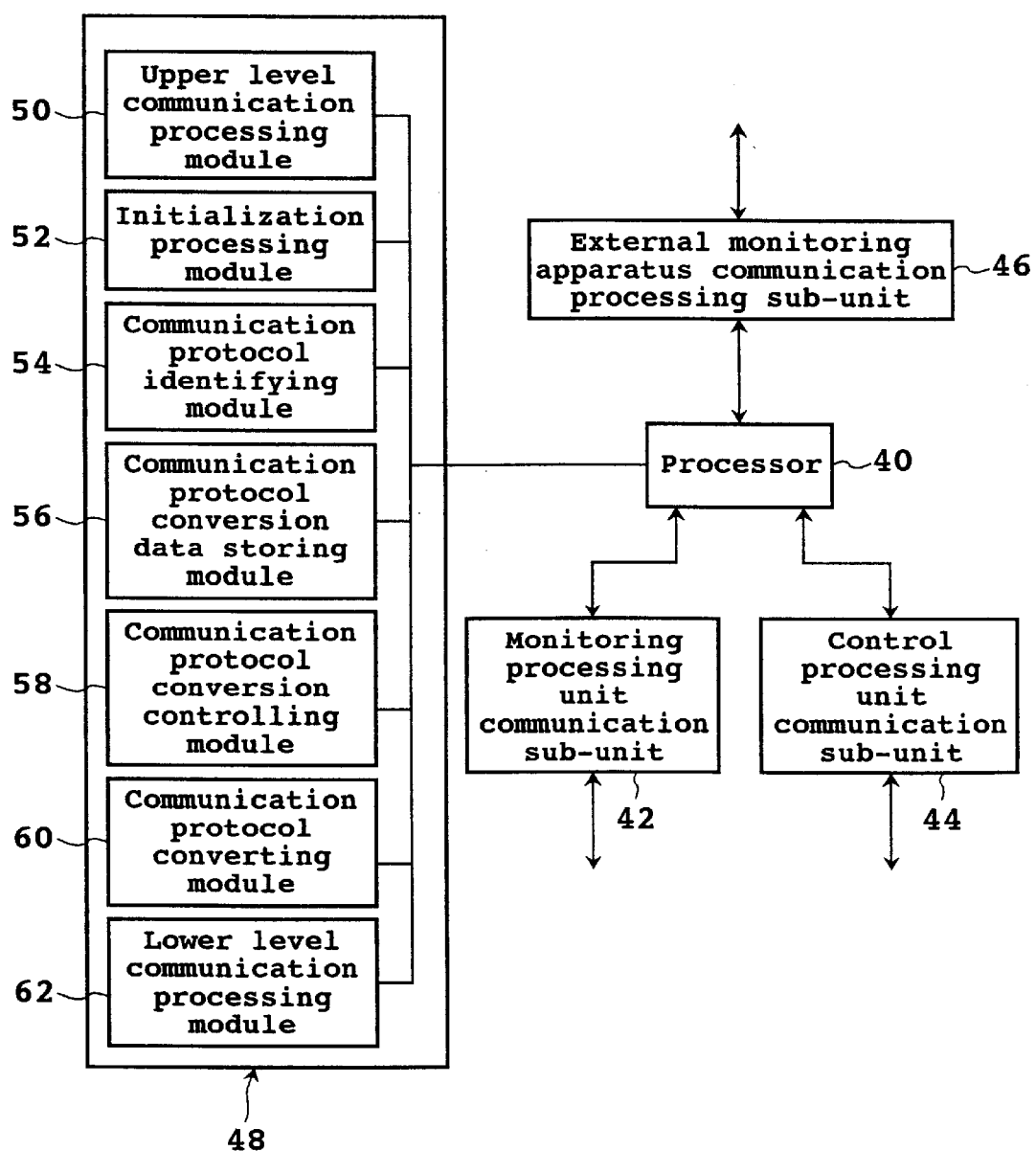
FIG. 3 is a diagram showing the configuration of an external interface processing unit employed in the communication apparatus shown in FIG. 2.

FIG. 3 is a diagram showing the configuration of the external interface processing unit 30 employed in the communication apparatus 20 shown in FIG. 2. As shown in the figure, the external interface processing unit 30 comprises a processor 40, a monitoring processing unit communication sub-unit 42, a control processing unit communication sub-unit 44, an external monitoring apparatus communication processing sub-unit 46 and a recording medium 48 for storing communication controlling software. The processor 40 fetches instructions of a communication controlling program of the communication controlling software from the recording medium 48 for execution. The processor 40 is connected to each of the monitoring processing unit communication sub-unit 42, the control processing unit communication sub-unit 44, the external monitoring apparatus communication processing sub-unit 46, and the recording medium 48 by a bus. The monitoring processing unit communication sub-unit 42 is a receiving driver for receiving monitoring information and an alarm notification from the monitoring processing unit 26 and passing on the monitoring information and the alarm notification to the processor 40. On the other hand, the control processing unit communication sub-unit 44 is a transmitting/receiving driver for receiving a result of processing from the control processing unit 28 and passing on the result of processing to the processor 40. In addition, the control processing unit communication subunit 44 is also used for receiving a control command from the processor 40 and passing on the control command to the control processing unit 28.

The external monitoring apparatus communication processing sub-unit 46 is a transmitting/receiving driver for receiving monitoring information, an alarm notification and a result of processing from the processor 40 and transmitting the monitoring information, the alarm notification and the result of processing to the external monitoring apparatus 32. In addition, the external monitoring apparatus communication processing sub-unit 46 is also used for receiving a control command from the external monitoring apparatus 32 and transferring the control command to the processor 40. The communication controlling software stored in the recording medium 48 which is implemented typically by a RAM (Random Access Memory) or a ROM (Read Only Memory) is communication controlling programs including an upper level communication controlling module 50, an initialization processing module 52, a communication protocol identifying module 54, a communication protocol conversion data storing module 56, a communication protocol conversion controlling module 58, a communication protocol converting module 60 and a lower level communication controlling module 62. The recording medium 48 is connected to the processor 40 by typically a bus. The upper level communication controlling module 50 is a program for controlling exchanges of data between the external monitoring apparatus communication processing sub-unit 46 and the external monitoring apparatus 32. The initialization processing module 52 is a program which is invoked to initialize a memory space when the external interface processing unit 30 is activated. In addition, the initialization processing module 52 also loads the communication protocol conversion controlling module 58, which is also a program as will be described later, into a main memory not shown in the figure for execution.

The communication protocol identifying module 54 is a program for identifying the communication protocol adopted by the external monitoring apparatus 32. There are a variety of conceivable methods of identifying the communication protocol adopted by the external monitoring apparatus 32. Some examples of them are described as follows.

1 The external monitoring apparatus 32 is designed so that, when the external monitoring apparatus 32 receives a message from the external interface processing unit 30 normally, the external monitoring apparatus 32 transmits an acknowledge response (ACK) to the external interface processing unit 30 and, when the external monitoring apparatus 32 does not receive a message from the external interface processing unit 30 normally due to the fact that the message has been transmitted not in accordance with a communication protocol adopted by the external monitoring apparatus 32, on the other hand, the external monitoring apparatus 32 transmits a non-acknowledge response (NAK) to the external interface processing unit 30. With the external monitoring apparatus 32 designed into such a scheme, the external interface processing unit 30 transmits a communication protocol identifying signal of its own for identifying the communication protocol adopted by the external monitoring apparatus 32 to the external monitoring apparatus 32 on its own initiative in accordance with a communication protocol supposed to be adopted by the external monitoring apparatus 32 when the external monitoring apparatus 32 is started. If an ACK response is received from the external monitoring apparatus 32, the external interface processing unit 30 judges the communication protocol, according to which the communication protocol identifying signal was transmitted to the external monitoring apparatus 32, to be the communication protocol adopted by the external monitoring apparatus 32. If no ACK response is received from the external monitoring apparatus 32, on the other hand, the external interface processing unit 30 repeats an operation to transmit the communication protocol identifying signal to the external monitoring apparatus 32 on its own initiative in accordance with another communication protocol supposed to be adopted by the external monitoring apparatus 32 till an ACK response to the communication protocol identifying signal is received from the external monitoring apparatus 32 in which case the external interface processing unit 30 judges the communication protocol, according to which the communication protocol identifying signal was transmitted to the external monitoring apparatus 32, to be the communication protocol adopted by the external monitoring apparatus 32.

2 The external monitoring apparatus 32 is designed so that, when the external monitoring apparatus 32 receives a message from the external interface processing unit 30 normally, the external monitoring apparatus 32 transmits an acknowledge response (ACK) to the external interface processing unit 30 and, when the external monitoring apparatus 32 does not receive a message from the external interface processing unit 30 normally due to the fact that the message has been transmitted not in accordance with a communication protocol adopted by the external monitoring apparatus 32, on the other hand, the external monitoring apparatus 32 transmits a non-acknowledge response (NAK) to the external interface processing unit 30. With the external monitoring apparatus 32 designed into such a scheme, the external interface processing unit 30 transmits a message such as monitoring information, an alarm notification and a result of processing to the external monitoring apparatus 32 in accordance with a communication protocol. If an ACK response is received from the external monitoring apparatus 32, the external interface processing unit 30 judges the communication protocol, according to which the message was transmitted to the external monitoring apparatus 32, to be the communication protocol adopted by the external monitoring apparatus 32. If no ACK response is received from the external monitoring apparatus 32, on the other hand, the external interface processing unit 30 repeats an operation to transmit the message to the external monitoring apparatus 32 in accordance with another communication protocol till an ACK response to the message is received from the external monitoring apparatus 32 in which case the external interface processing unit 30 judges the communication protocol, according to which the message was transmitted to the external monitoring apparatus 32, to be the communication protocol adopted by the external monitoring apparatus 32.

3 There is also provided a method for identifying the communication protocol adopted by the external monitoring apparatus 32 from a signal which is transmitted by the external monitoring apparatus 32 when the external monitoring apparatus 32 is started. In this method, it is assumed that the external monitoring apparatus 32 is designed so that, when the external monitoring apparatus 32 is started, the external monitoring apparatus 32 transmits a signal to the communication apparatus 20 in order to establish communication with the communication apparatus 20.

It is assumed that the method 1 described above is adopted in the present embodiment typically for identifying the communication protocol adopted by the external monitoring apparatus 32. The communication protocol conversion data storing module 56 is an area for storing communication protocol conversion data used for converting monitoring information, an alarm notification and a result of processing into data conforming to the communication protocol adopted by the external monitoring apparatus 32. The communication protocol conversion data comprises a result of conversion or a technique of communication protocol conversion of monitoring information or an alarm notification received from the monitoring processing unit 26 or a result of processing received from the control processing unit 28 for each communication protocol supposed to be adopted by the external monitoring apparatus 32. The communication protocol conversion controlling module 58 is a program that functions in accordance with a control signal generated by a dip switch employed in the communication apparatus 20 but not shown in the figures. The control signal indicates whether or not communication protocol conversion is to be implemented. With the control signal indicating that the communication protocol conversion is not to be implemented, monitoring information, an alarm notification and a result of processing are passed on to the external monitoring apparatus 32 as they are without changing the communication protocol. With the control signal indicating that the communication protocol conversion is to be implemented, on the other hand, monitoring information, an alarm notification and a result of processing are passed on to the external monitoring apparatus 32 as they are without changing the communication protocol if the communication protocol adopted by the external monitoring apparatus 32 is found coincident with that of the communication apparatus 20. If the communication protocol adopted by the external monitoring apparatus 32 is found different from that of the communication apparatus 20, on the other hand, the communication protocol conversion controlling module 58 activates the communication protocol converting module 60 to convert the monitoring information, the alarm notification and the result of processing into data conforming to the communication protocol adopted by the external monitoring apparatus 32.

The dip switch can be set to generate a control signal indicating whether the communication protocol conversion is to be or not to be implemented for the following reason. When the communication protocol of the external monitoring apparatus 32 has not been identified yet, for example, when a new external monitoring apparatus 32 has just been installed, the dip switch is set to generate a control signal indicating that the communication protocol conversion is not to be implemented because the correct communication protocol adopted by the external monitoring apparatus 32 is not known yet any way. Once the communication protocol adopted by the external monitoring apparatus 32 has been identified, however, the dip switch is set to generate a control signal indicating that the communication protocol conversion is to be implemented because the correct communication protocol adopted by the external monitoring apparatus 32 is now known. In addition, the external interface processing unit 30 can be connected to 2 external monitoring apparatuses 32, that is, the existing external monitoring apparatus 32 having a certain communication protocol and a new external monitoring apparatus 32 with a communication protocol different from the communication protocol adopted by the existing external monitoring apparatus 32 for replacing the existing one after its new communication protocol has been identified by the external interface processing unit 30 as described earlier. With this scheme, the already known communication protocol is used for transmitting data to the existing external monitoring apparatus 32 till the new communication protocol is identified. After the new communication protocol has been identified, however, data can be transmitted to the newly installed external monitoring apparatus 32 in accordance with the identified communication protocol. As a result, the external monitoring apparatus 32 can be replaced with a new one without the need to temporarily halt the external monitoring apparatus 32. As a result, reliability of the communication and the network operation can be sustained.

The communication protocol converting module 60 is a program used for converting monitoring information, an alarm notification and a result of processing generated in the communication apparatus 20 into data conforming to the communication protocol adopted by the external monitoring apparatus 32. The lower level communication processing module 62 is a program used for controlling exchanges of data between the monitoring processing unit communication sub-unit 42 and the monitoring processing unit 26 and between the control processing unit communication sub-unit 44 and the control processing unit 28.

The operation of the communication apparatus 20 shown in FIG. 2 is explained as follows.

[a] Identification of the Communication Protocol Adopted by the External Monitoring Apparatus 32.

When the power supply of the communication apparatus 20 is turned on, a power-on reset signal is generated in the communication apparatus 20 and transmitted to the external interface processing unit 30. Receiving the power-on reset signal, the external interface processing unit 30 is started and activates the initialization processing module 52. The initialization processing module 52 initializes the memory space and in turn activates the communication protocol identifying module 54. By the same token, when the power supply is turned on, the external monitoring apparatus 32 is started. The activation of the external monitoring apparatus 32 is detected by the external monitoring apparatus communication processing sub-unit 46 which then informs the communication protocol identifying module 54 through the upper level communication processing module 50.

Figure 4:
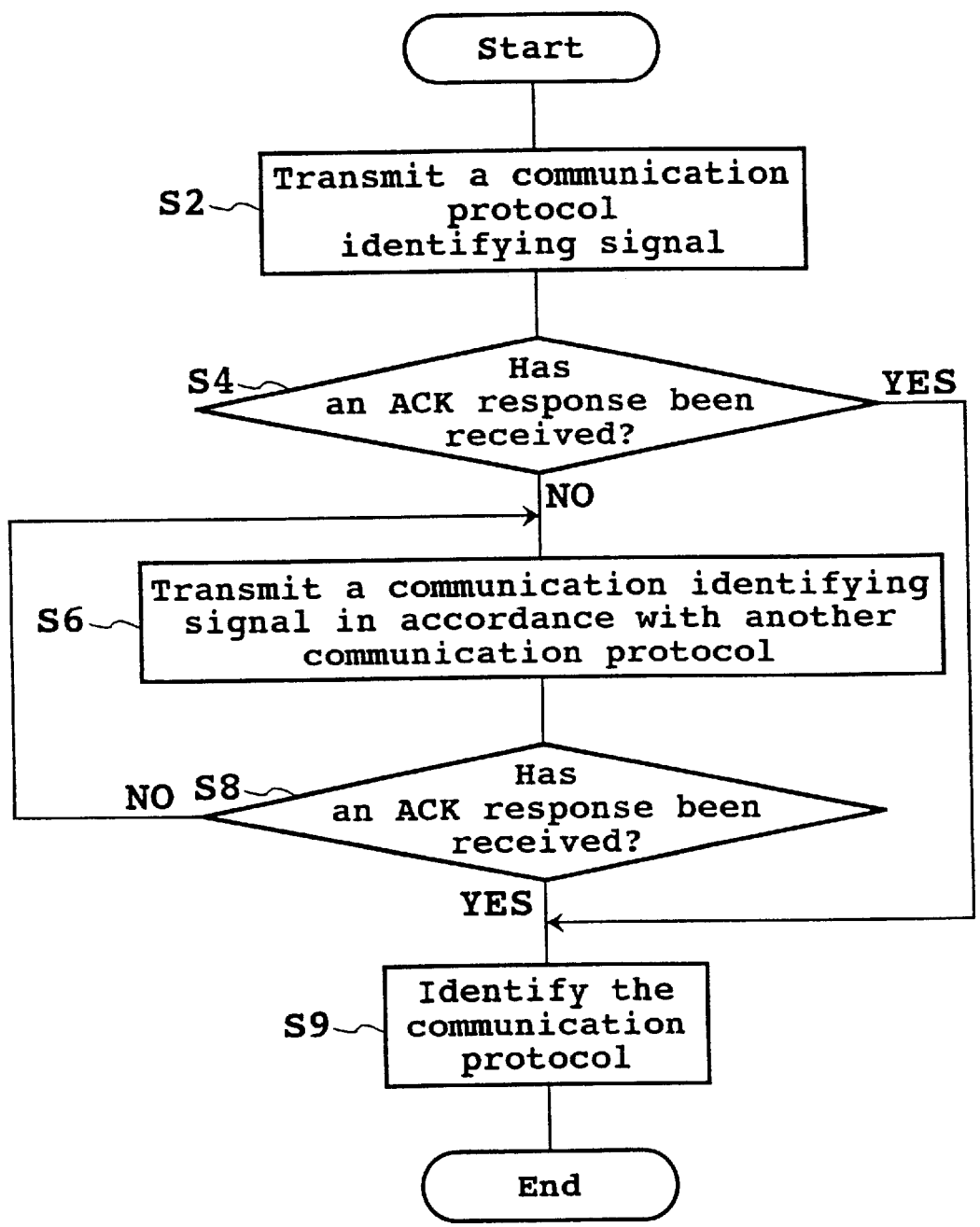
FIG. 4 shows a flowchart representing operations carried out by a communication protocol identifying unit employed in the external interface processing unit shown in FIG. 3.

FIG. 4 shows a flowchart representing operations carried out by the communication protocol identifying module 54 employed in the external interface processing unit 30 shown in FIG. 3. As shown in FIG. 4, the flowchart begins with a step S2, at which a communication protocol identifying signal for identifying the communication protocol adopted by the external monitoring apparatus 32 is transmitted to the external monitoring apparatus 32. The communication protocol identifying signal is a signal which only the external monitoring apparatus 32 adopting the protocol can receive normally. Examples of the communication protocol identifying signal is an alarm notification and a result of processing described earlier. In addition, an alarm notification or a result of processing used as a communication protocol identifying signal includes information indicating that the alarm notification or the result of processing is used specially as a communication protocol identifying signal and not an ordinary alarm notification or an ordinary result of processing. Receiving the communication protocol identifying signal, the external monitoring apparatus 32 checks the signal and transmits an ACK response to the communication protocol identifying signal to the external interface processing unit 30 if the signal is found received normally in accordance with its own communication protocol. If the communication protocol identifying signal is not received normally in accordance with its own communication protocol, on the other hand, the external monitoring apparatus 32 transmits a NAK response to the communication protocol identifying signal to the external interface processing unit 30.

The flow of the program 54 then goes on to a step S4 to form a judgment as to whether an ACK or NAK response is received from the external monitoring apparatus 32. If an ACK response is received from the external monitoring apparatus 32, the flow of the program 54 proceeds to a step S9. If a NAK response is received from the external monitoring apparatus 32, on the other hand, the flow of the program 54 proceeds to a step S6. At the step S6, the communication protocol identifying signal is retransmitted to the external monitoring apparatus 32 in accordance with another communication protocol. The flow of the program 54 then continues to a step S8 to form a judgment as to whether an ACK or NAK response is received from the external monitoring apparatus 32. If an ACK response is received from the external monitoring apparatus 32, the flow of the program 54 proceeds to the step S9. If a NAK response is received from the external monitoring apparatus 32, on the other hand, the flow of the program 54 returns to the step S6. At the step S9, the communication protocol used for transmitting the communication protocol identifying signal, for which an ACK response was received from the external monitoring apparatus 32, is judged to be the communication protocol adopted by the external monitoring apparatus 32. In this way, the communication protocol adopted by the external monitoring apparatus 32 can be identified.

[b] Communication Protocol Conversion Control

A control signal generated by the dip switch not in the figure to indicate whether the communication protocol conversion is to be or not to be implemented as described above is stored in a specific register or the like employed in the processor 40. Functions of the communication line interface unit 24 include relaying or multiplexing of principal signals to be transmitted as well as recognition of an operating state of a package employed therein as to which package is operating and detection of a principal signal failure and a hardware failure at a request made by the monitoring processing unit 26 in addition to notifying the monitoring processing unit 26 of alarming information on the failures.

The monitoring processing apparatus 26 monitors alarming states of the communication line interface 24 all the time and notifies the external interface processing unit 30 of the alarming states.

The control processing unit 28 gives the communication line interface unit 24 an instruction such as a command to switch the communication line from one to another in accordance with a control command received from the external monitoring apparatus 32 through the external interface processing unit 30. In addition, the communication line interface unit 24 carries out control processing for a package employed thereby in accordance with an instruction given by the control processing unit 28 and informs the control processing unit 28 of a result of the control processing. The control processing apparatus 28 in turn notifies the external interface processing unit 30 of the result of the control processing received from the communication line interface unit 24. In actuality, in the external interface processing unit 30, the alarm notification or monitoring information and the result of processing are received by the monitoring processing unit communication sub-unit 42 and the control processing unit communication sub-unit 44 respectively and passed on to the communication protocol conversion controlling module 58 through the lower level communication processing module 62.

Figure 5:
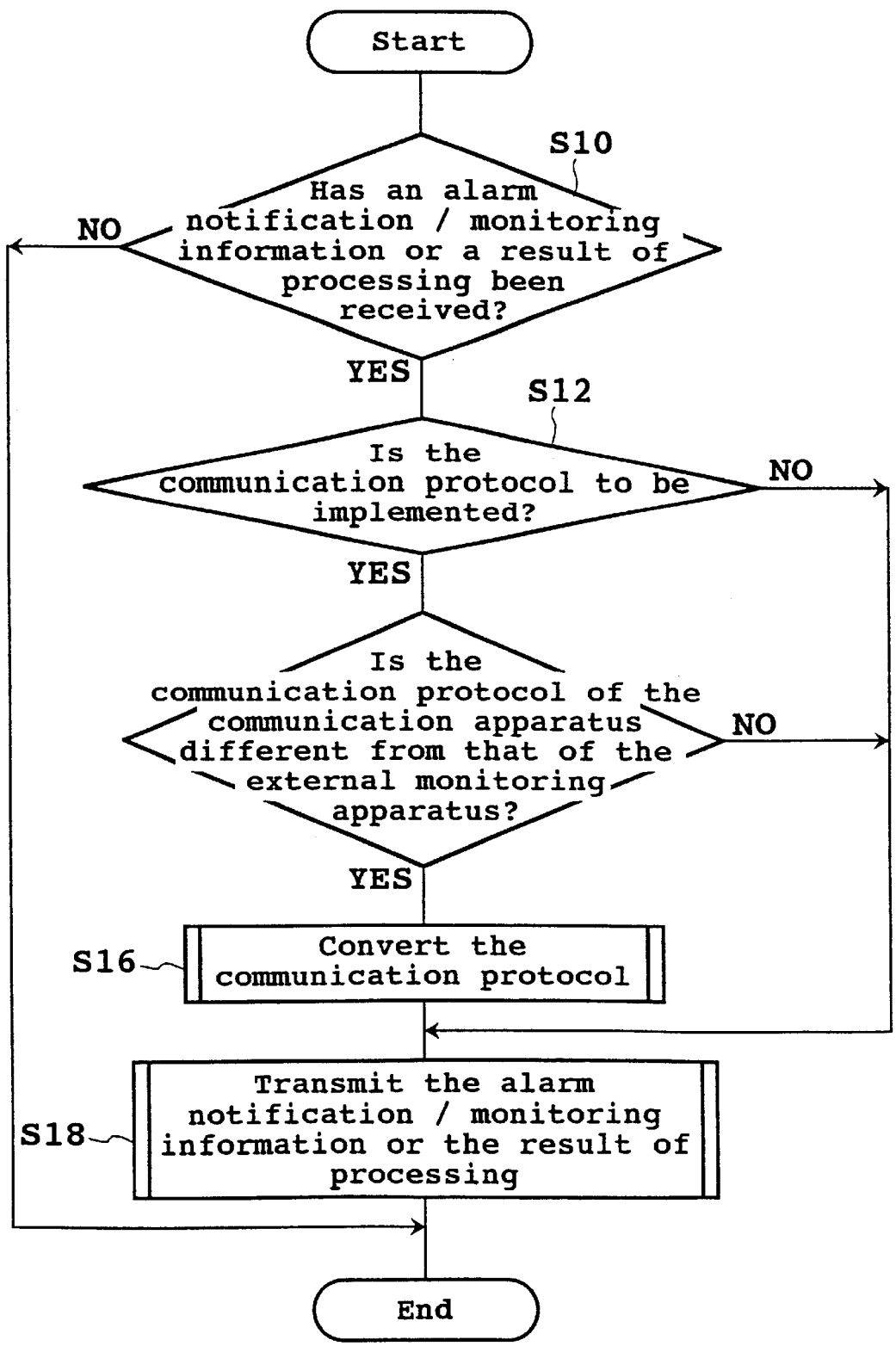
FIG. 5 shows a flowchart representing operations carried out by a communication protocol conversion controlling unit employed in the external interface processing unit shown in FIG. 3.

FIG. 5 shows a flowchart representing operations carried out by a communication protocol conversion controlling module 58 employed in the external interface processing unit 30 shown in FIG. 3. As shown in FIG. 5, the flowchart begins with a step S10 to form a judgment as to whether or not an alarm notification/monitoring information or a result of processing has been received. If an alarm notification/monitoring information or a result of processing has been received, the flow of the program 58 goes on to a step S12. If an alarm notification/monitoring information or a result of processing has not been received, on the other hand, the processing is terminated. At the step S12, the processor 40 forms a judgment as to whether or not the control signal generated by the dip switch and stored in a register and the like indicates that communication protocol conversion is to be implemented or not to be implemented. If the control signal generated by the dip switch indicates that communication protocol conversion is to be implemented, the flow of the program 58 goes on to a step S14. If the control signal generated by the dip switch indicates that communication protocol conversion is not to be implemented, on the other hand, the flow of the program 58 goes on to a step S18. At the step S14, the processor 40 forms a judgment as to whether or not the communication protocol adopted by the communication apparatus 20 is the same as that adopted by the external monitoring apparatus 32. If the communication protocol adopted by the communication apparatus 20 is not the same as that adopted by the external monitoring apparatus 32, the flow of the program 58 proceeds to a step S16. If the communication protocol adopted by the communication apparatus 20 is the same as that adopted by the external monitoring apparatus 32, on the other hand, the flow of the program 58 proceeds to the step S18.

At the step S16, the communication protocol converting module 60 is requested to convert the communication protocol adopted by the communication apparatus 20 into that adopted by the external monitoring apparatus 32. As will be described later, the communication protocol converting module 60 converts an alarm notification/monitoring information or a result of processing into data conforming to the communication protocol adopted by the external monitoring apparatus 32. At the step S18, the alarm notification/monitoring information or the result of processing received from the monitoring processing unit 26 or the control processing unit 28 respectively, or the data resulting from the communication protocol conversion carried out at the step S16 is transmitted to the external monitoring apparatus 32 by way of the upper level communication processing module 50 and the external monitoring apparatus communication processing sub-unit 46. The external monitoring apparatus 32 receives the alarm notification/monitoring information from the communication apparatus 20 monitored thereby and displays the alarm notification/monitoring information on an output unit such as a CRT to a person in charge of maintenance. On the other hand, the external monitoring apparatus 32 receives a control command from the maintenance person and passes on the control command to the communication apparatus 20. The external monitoring apparatus 32 then receives a result of processing transmitted by the communication apparatus 20 in response to the control command and displays the result of processing on the output unit such as the CRT. Since the alarm notification/monitoring information and the result of processing are transmitted in accordance with the communication protocol adopted by the external monitoring apparatus 32, they are received by the apparatus 32 normally.

When the existing external monitoring apparatus 32 is replaced by a new external monitoring apparatus 32 having a communication protocol different from that adopted by the existing apparatus 32, the external interface processing unit 30 is connected to both the external monitoring apparatuses 32 till the communication protocol of the new external communication apparatus 32 is identified. As the communication protocol of the new external communication apparatus 32 is identified, the old external monitoring apparatus 32 can be disconnected from the external interface processing unit 30 and, since the communication protocol adopted by the new external monitoring apparatus 32 is known, the dip switch can be set to generate a control signal indicating that the communication protocol conversion is to be implemented to allow the communication protocol adopted by the communication apparatus 20 to be converted into that of the new external monitoring apparatus 32. As a result, the external monitoring apparatus 32 can be replaced with a new one without the need to temporarily halt the external monitoring apparatus 32.

[c] Communication Protocol Conversion

Figure 6:
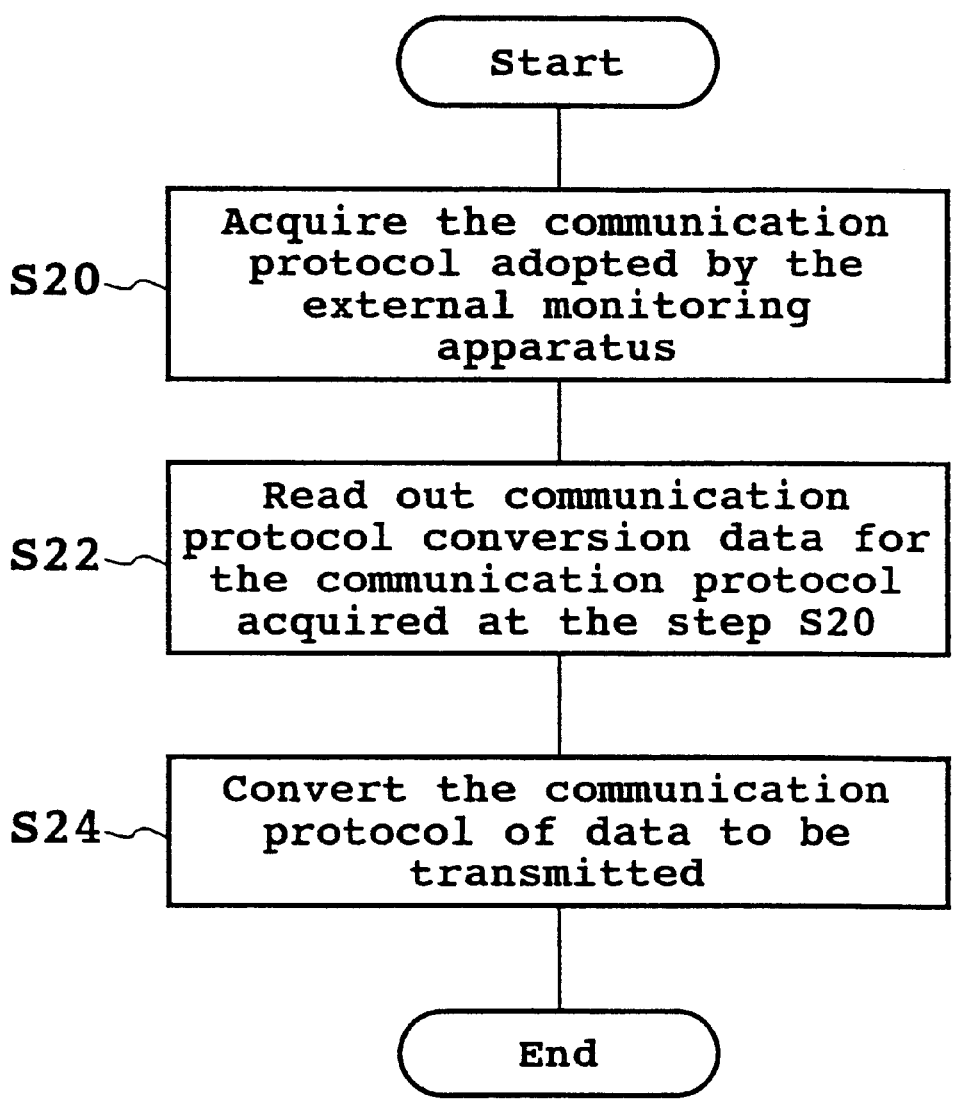
FIG. 6 shows a flowchart representing operations carried out by a communication protocol converting unit employed in the external interface processing unit shown in FIG. 3.
Figure 7:
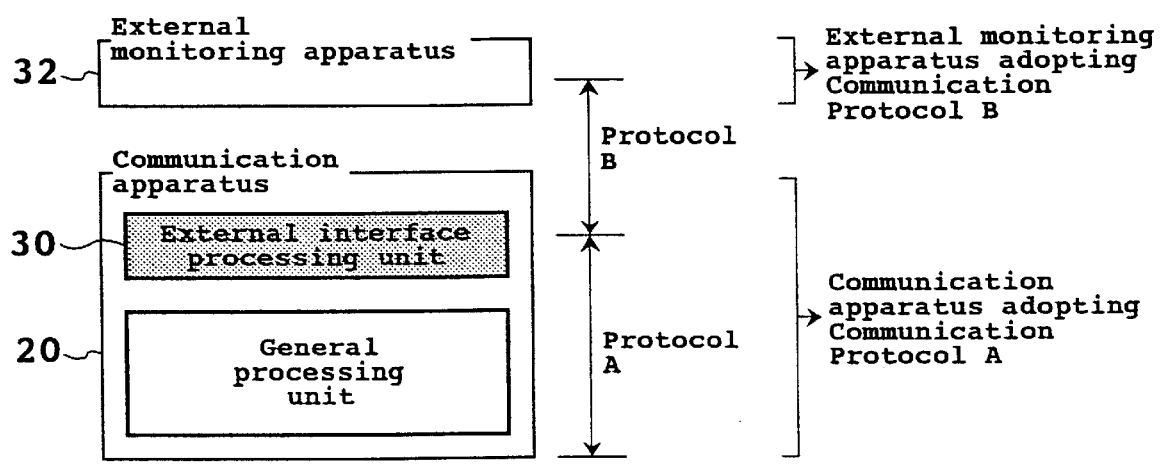
FIG. 7 is a diagram showing communication protocol conversion.

FIG. 6 shows a flowchart representing operations carried out by a communication protocol converting module 60 employed in the external interface processing unit 30 shown in FIG. 3. As shown in FIG. 6, the flowchart begins with a step S20 at which the communication protocol of the external monitoring apparatus 32 identified by the communication protocol identifying module 54 shown in FIG. 4 is acquired from the communication protocol conversion controlling module 58. The flow of the program 60 then goes on to a step S22 at which communication protocol conversion data corresponding to the communication protocol acquired at the step S20 is read out from the communication protocol conversion data storing module 56. Then, the flow of the program 60 proceeds to a step S24 at which an alarm notification/monitoring information or a result of processing received from the monitoring processing unit 26 or the control processing unit 28 respectively is converted into data by using the protocol conversion data read out at the step S22. The control of execution is then returned to the calling protocol conversion controlling module 58 shown in FIG. 5. Assume that the communication apparatus 20 and the external monitoring apparatus 32 adopt communication protocols A and B respectively as shown in FIG. 7. In this case, the external interface processing unit 30 converts the communication protocol from communication protocol A into communication protocol B, allowing data conforming to communication protocol B transmitted by the communication apparatus 20 to be received normally by the external monitoring apparatus 32.

According to the first embodiment described above, the communication apparatus 20 is provided with an external interface processing unit 30 for identifying a communication protocol adopted by an external monitoring apparatus 32 and for automatically converting data conforming to the communication protocol adopted by the communication apparatus 20 into data conforming to the communication protocol adopted by the external monitoring apparatus 32. As a result, addition of a new communication apparatus 20 to the communication network with a communication protocol used for communicating with the external monitoring apparatus 32 different from those of the existing communication apparatuses 20 will not make it necessary to make any change to the external monitoring apparatus 32. In addition, in the case of a communication network built to connect communication apparatuses 20 having a certain communication protocol used for communicating with an external monitoring apparatus 32, even if the communication apparatuses 20 are replaced with those each having new functions and a different communication protocol, it is no longer necessary to change the external monitoring apparatus 32 with one that keeps up with the new communication protocol. That is to say, it is now possible to replace only the communication apparatus 20 by one having new functions and a different communication protocol with the external monitoring apparatus 32 kept unchanged.

SECOND EMBODIMENT

Figure 8:
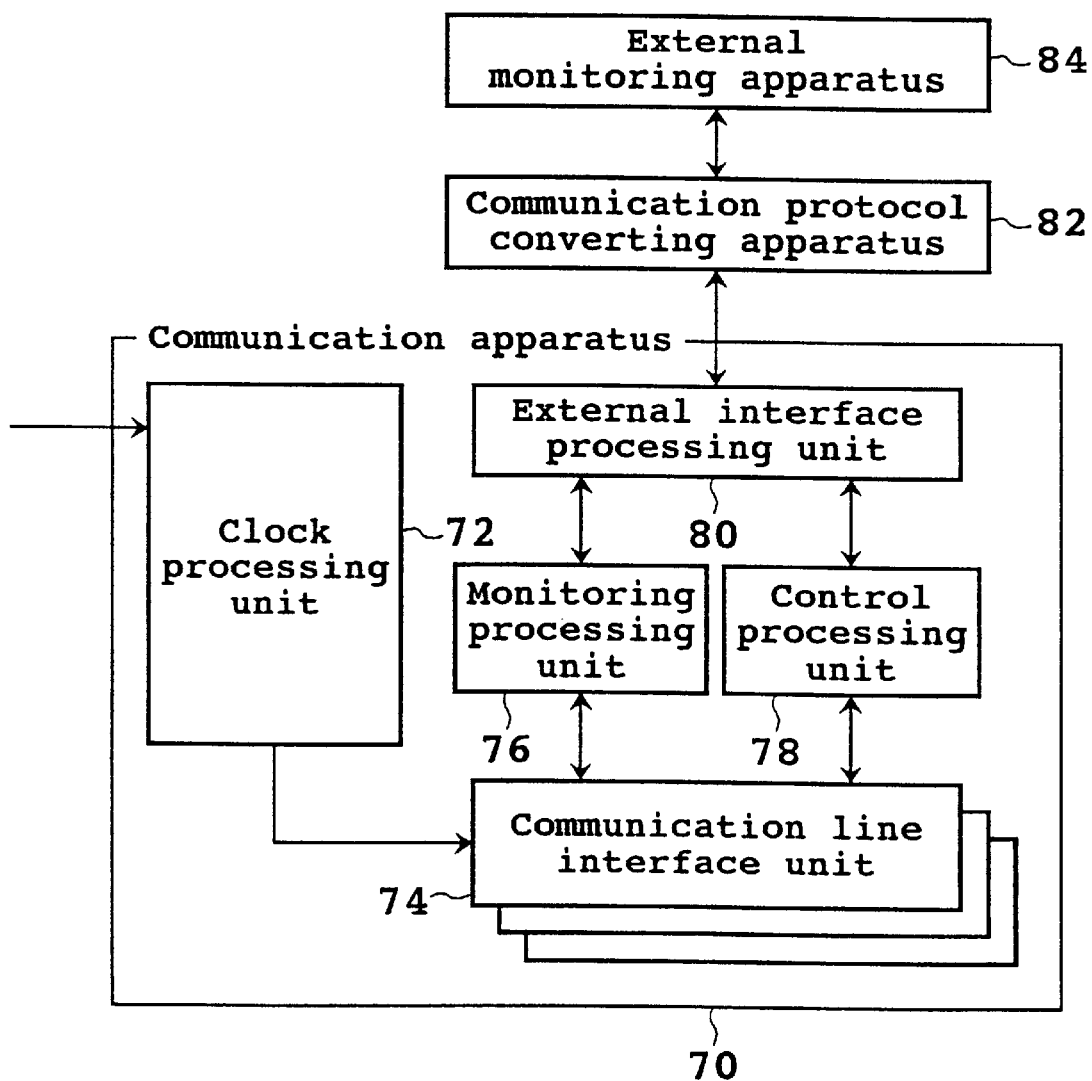
FIG. 8 is a diagram showing the configuration of a data transmission system comprising an external monitoring apparatus, a communication apparatus and a communication protocol converting apparatus, that is, a communication controlling apparatus implemented by a second embodiment of the present invention.

FIG. 8 is a diagram showing the configuration of a data transmission system including a communication controlling apparatus implemented by a second embodiment of the present invention. As shown in the figure, the data transmission system includes a communication protocol converting apparatus 82 to which the communication controlling apparatus implemented by the second embodiment of the present invention is applied. Unlike the first embodiment wherein the communication controlling apparatus is embedded in the communication apparatus 20 as the external interface processing unit 30, in the case of the second embodiment, the communication protocol converting apparatus 82 is provided between a communication apparatus 70 and an external monitoring apparatus 84. The communication apparatus 70 is typically an SDH apparatus which comprises a clock processing unit 72, a communication line interface unit 74, a monitoring processing unit 76, a control processing unit 78 and an external interface processing unit 80.

Since the clock processing unit 72, the communication line interface unit 74, the monitoring processing unit 76 and the control processing unit 78 are identical with the clock processing unit 22, the communication line interface unit 24, the monitoring processing unit 26 and the control processing unit 28 of the first embodiment shown in FIG. 2, their explanation is not repeated. An external interface processing 80 serves as an interface with the communication protocol converting apparatus 82 which has the same functions as the external interface processing unit 30 of the first embodiment shown in FIG. 2. However, the communication protocol converting apparatus 82 is different from the external interface processing unit 30 in that the former is provided outside the communication apparatus 70. Thus, the communication protocol converting apparatus 82 is connected to the external monitoring apparatus 84 and the communication apparatus 70 by cables through connectors. Since the external monitoring apparatus 84 is identical with the external monitoring apparatus 32 of the first embodiment shown in FIG. 2, its explanation is not repeated.

Figure 9:
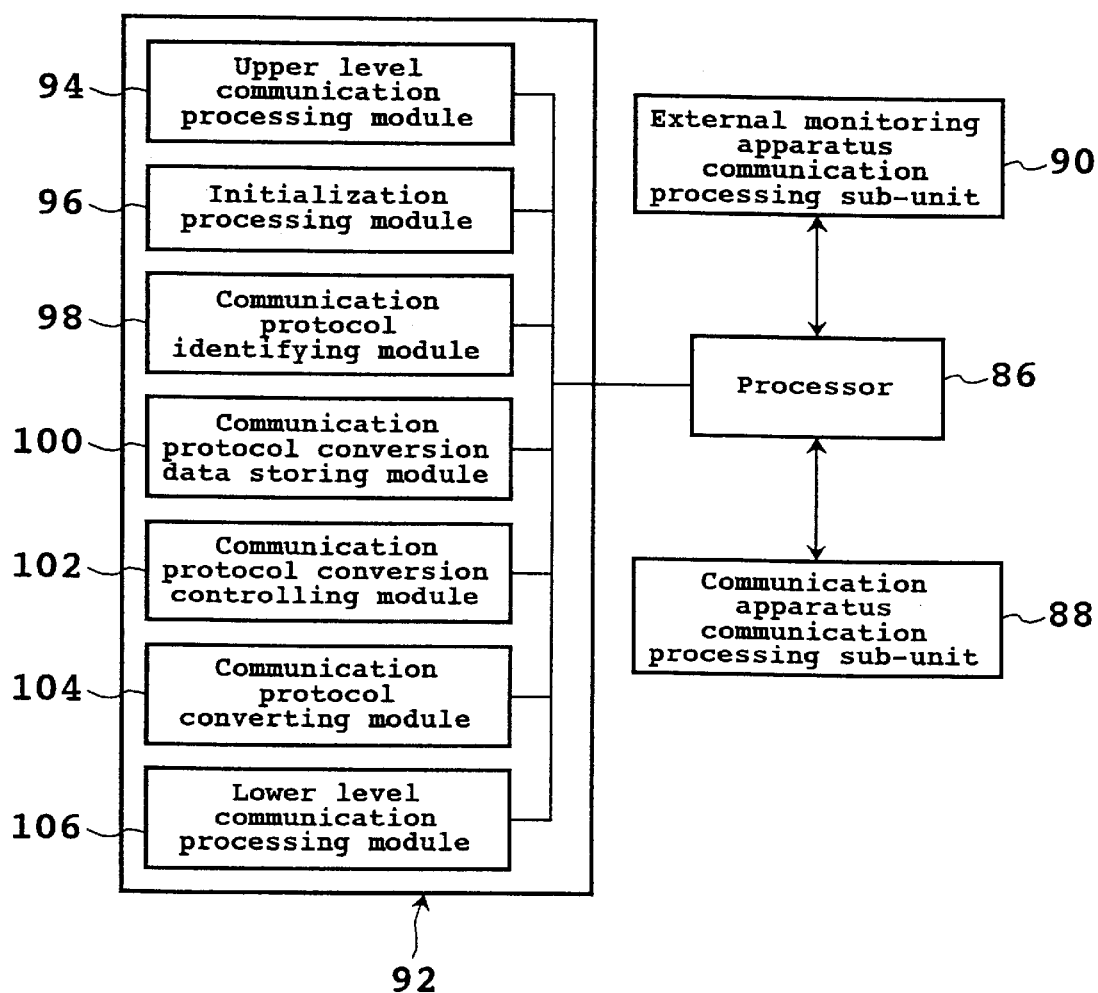
FIG. 9 is a diagram showing the communication protocol converting apparatus employed in the data transmission system shown in FIG. 8.

FIG. 9 is a diagram showing the communication protocol converting apparatus 82 employed in the data transmission system shown in FIG. 8. As shown in FIG. 9, the communication protocol converting apparatus 82 comprises a processor 86, a transmission apparatus communication processing sub-unit 88, an external monitoring apparatus communication processing unit 90 and a recording medium 92. The processor 86 fetches instructions of communication controlling programs stored in the recording medium 92 for execution. The processor 86 is connected to each of the transmission apparatus communication processing sub-unit 88, the external monitoring apparatus communication processing unit 90 and the recording medium 92 by a bus. The transmission apparatus communication processing sub-unit 88 and the external monitoring apparatus communication processing unit 90 are communication processing units serving as interfaces with the communication apparatus 70 and the external monitoring apparatus 84 respectively.

Communication controlling software stored in the recording medium 92 which is typically implemented by a RAM or a ROM is communication controlling programs including an upper level communication controlling module 94, an initialization processing module 96, a communication protocol identifying module 98, a communication protocol conversion data storing module 100, a communication protocol conversion controlling module 102, a communication protocol converting module 104 and a lower level communication controlling module 106. The processor 86 is connected to the recording medium 92 by a bus. The upper level communication controlling module 94 is a program for controlling exchanges of data between the external monitoring apparatus communication processing sub-unit 90 and the external monitoring apparatus 84. On the other hand, the lower level communication controlling module 106 is a program for controlling exchanges of data between the transmission apparatus communication processing sub-unit 88 and the communication apparatus 70. Since the functions of the initialization processing module 96, the communication protocol identifying module 98, the communication protocol conversion data storing module 100, the communication protocol conversion controlling module 102, the communication protocol converting module 104 and the lower level communication controlling module 106 are identical with the functions of the initialization processing module 52, the communication protocol identifying module 54, the communication protocol conversion data storing module 56, the communication protocol conversion controlling module 58, the communication protocol converting module 60 and a lower level communication controlling module 62 of the first embodiment shown in FIG. 3 respectively, their explanation is omitted.

Figure 10:
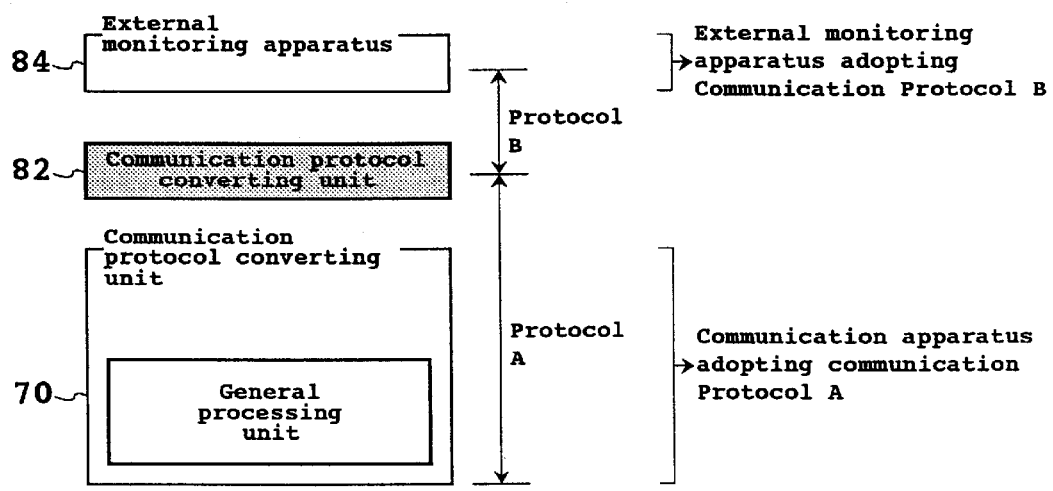
FIG. 10 is a diagram showing communication protocol conversion.

FIG. 10 is a diagram showing communication protocol conversion. The operation of the communication protocol converting apparatus 82 provided by the second embodiment of the present invention is explained by referring to FIG. 8 as follows.

[a] Identification of the Communication Protocol Adopted by the External Monitoring Apparatus 84

Much like the communication protocol identifying module 54 of the first embodiment shown in FIG. 3, the communication protocol identifying module 98 is used for identifying the communication protocol adopted by the external monitoring apparatus 84.

[b] Communication Protocol Conversion Control

Much like the communication protocol conversion controlling module 58 shown in FIG. 3, the communication protocol conversion controlling module 102 controls communication protocol conversion, transmitting alarm notifications/monitoring information and results of processing to the external monitoring apparatus 84 by way of the upper level communication processing module 94 and the external monitoring apparatus communication processing sub-unit 90.

[c] Communication Protocol Conversion

Much like the communication protocol converting module 60 of the first embodiment shown in FIG. 3, the communication protocol converting module 104 converts an alarm notification/monitoring information or a result of processing to be transmitted to the external monitoring apparatus 84 into data conforming to the communication protocol adopted by the external monitoring apparatus 84 in accordance with a command received from the communication protocol conversion controlling module 102. As a result, even in the case of a data transmission system wherein the communication apparatus 70 and the external monitoring apparatus 84 adopt communication protocols A and B respectively as shown in FIG. 10, the communication protocol converting unit 82 converts the communication protocol from communication protocol A into communication protocol B, allowing an alarm notification/monitoring information or a result of processing conforming to communication protocol B transmitted by the communication apparatus 70 to be received normally by the external monitoring apparatus 84.

As described above, the second embodiment provides the same effects as the first embodiment.

THIRD EMBODIMENT

Figure 11:
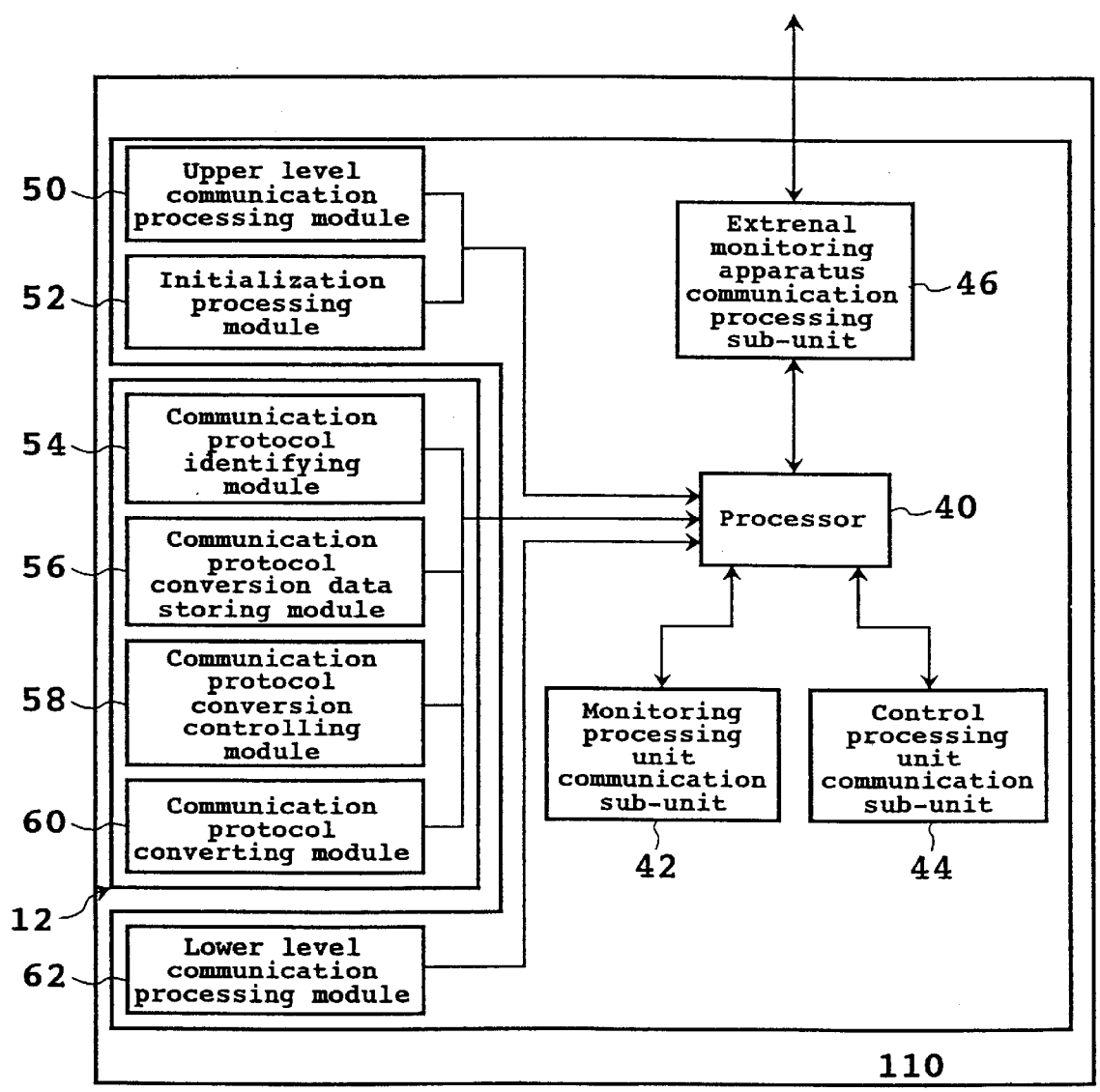
FIG. 11 is a diagram showing the configuration of a communication controlling apparatus implemented by a third embodiment of the present invention.

FIG. 11 is a diagram showing the configuration of a communication controlling apparatus implemented by a third embodiment of the present invention. Elements having identical functions with those employed in the communication controlling apparatus or the external interface processing unit 30 of the first embodiment shown in FIG. 3 are denoted by the same reference numerals as the latter. As shown in FIG. 11, the communication controlling apparatus, that is, the external interface processing unit 110, comprises a processor 40, a monitoring processing unit communication sub-unit 42, a control processing unit communication sub-unit 44, an external monitoring apparatus communication processing sub-unit 46, an upper level communication processing module 50, an initialization processing module 52, a recording medium 112 and a lower level communication processing module 62. Unlike the first embodiment shown in FIG. 3, however, in the case of the third embodiment, the recording medium 112 is used for storing only communication controlling programs that are directly related to communication protocol conversion, that is the communication protocol identifying module 54, the communication protocol conversion data storing module 56, the communication protocol conversion controlling module 58 and the communication protocol converting module 60 as shown in FIG. 11. The processor 40, the monitoring processing unit communication sub-unit 42, the control processing unit communication sub-unit 44, the external monitoring apparatus communication processing sub-unit 46, the upper level communication processing module 50, the initialization processing module 52, and the lower level communication processing module 62 have the same configurations as their counterparts employed in the external interface processing unit of the first embodiment shown in FIG. 3. The recording medium 112 is designed as a memory card implemented typically by a flash memory.

The recording medium 112 is inserted into a card interface unit not shown in the figure in order to connect the recording medium 112 to the processor 40. Communication programs stored in the recording medium 112 are loaded into a main memory for execution.

In addition, the recording medium 112 can be taken out from the card interface unit to be replaced by another recording medium 112 for storing new communication controlling programs capable of handling additional communication protocols. In this case, when the other recording medium 112 is inserted into the card interface unit and the processor 40 is started, the initialization processing module 52 loads the communication protocol identifying module 54, a communication controlling program stored in the recording medium 112, into the main memory.

The following is a description of the operation of the external interface processing unit 110 implemented by the third embodiment of the present invention with reference to FIG. 11. Basically, the operation of the external interface processing unit 110 is the same as the external interface processing unit 30 of the first embodiment shown in FIG. 3 except that there are differences in interface (between the processor 40 and the recording medium 112) between the former and the latter. When the recording medium 112 is inserted into the card interface unit or when the communication apparatus 20 shown in FIG. 2 is started, the processor 40 is started and the initialization processing module 52 is activated to carry out processing such as initialization of the memory space. Then, the communication protocol identifying module 54 is loaded by the initialization processing module 52 into the main memory for execution. The communication protocol identifying module 54, the communication protocol conversion controlling module 58 and the communication protocol converting module 60 operate in the same way as their counterparts employed in the external interface processing unit 30 of the first embodiment shown in FIG. 3 respectively, transmitting an alarm notification/ monitoring information or a result of processing completing communication protocol conversion in accordance with a communication protocol adopted by the external monitoring apparatus 32 to the external monitoring apparatus 32. In addition, when a new communication protocol is introduced to the external monitoring apparatus 32, the external interface processing unit 110 allows the existing recording medium 112 to be taken out from the card interface unit to be replaced by a new recording medium 112 which keeps up with the new communication protocol.

When the processor 40 is started with the new recording medium 112 inserted into the card interface unit which serves as an interface between the recording medium 112 and the processor 40, the initialization processing module 52 is executed. The initialization processing module 52 in turn loads the communication protocol identifying module 54 from the inserted recording medium 112 into the main memory and activates the communication protocol identifying module 54. When the external monitoring apparatus 32 with a new communication protocol connected to the communication apparatus 20 through connectors is started, the communication protocol identifying module 54 identifies the communication protocol adopted by the external monitoring apparatus 32 and the communication protocol converting module 60 converts the communication protocol of an alarm notification/monitoring information or a result of processing into a communication protocol adopted by the external monitoring apparatus 32 prior to transmission of the alarm notification/monitoring information or the result of processing to the external monitoring apparatus 32. In this way, the external interface processing unit 110 is capable of keeping up with a new communication protocol adopted by the external communication apparatus 32 by merely replacing the existing recording medium 112 by another one for the new communication protocol without the need to restart the communication apparatus 20.

As described above, in the case of the third embodiment, the communication controlling programs such as the communication protocol identifying module 54 are stored in the easily replaceable recording medium 112 to give the same effects as the first embodiment. In this way, the external interface processing unit 110 is capable of keeping up with changes in communication protocol adopted between the communication apparatus 20 and the external monitoring apparatus 32 due to, among other reasons, addition of new functions to the communication apparatus 20 by merely replacing the existing recording medium 112 by another one coping with the changes in communication protocol without the need to temporarily halt the operation of the communication apparatus 32. As a result, the external interface processing unit 110 is expected to be able to contribute to the enhancement of the reliability of the communication network operation.

FOURTH EMBODIMENT

Figure 12:
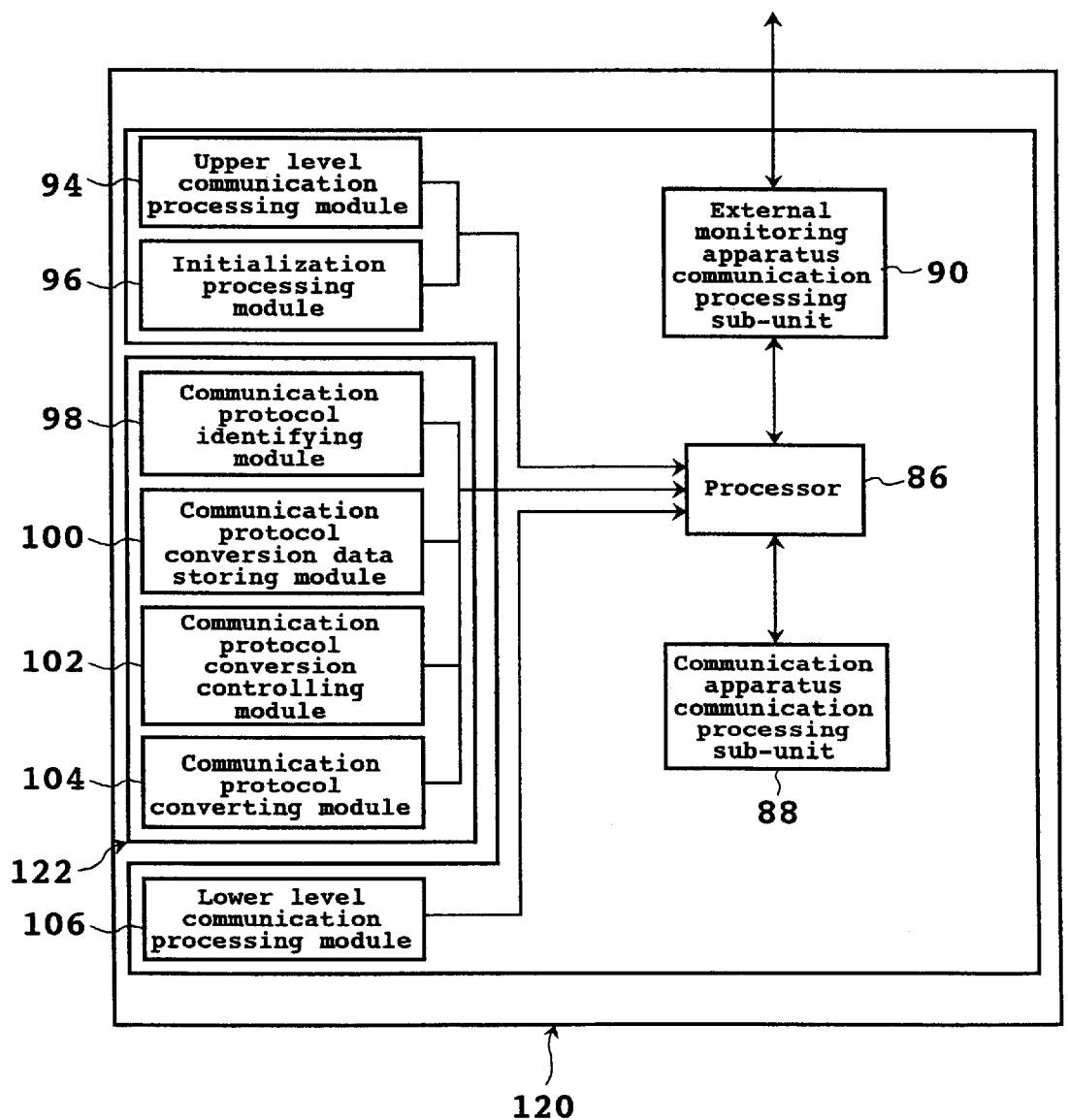
FIG. 12 is a diagram showing the configuration of a communication protocol converting apparatus, that is, a communication controlling apparatus implemented by a fourth embodiment of the present invention.

FIG. 12 is a diagram showing the configuration of a communication controlling apparatus implemented by a fourth embodiment of the present invention. Elements having identical functions with those employed in the communication protocol converting apparatus 82 of the second embodiment shown in FIG. 9 are denoted by the same reference numerals as the latter. As shown in FIG. 12, the communication controlling apparatus, that is, the communication protocol converting apparatus 120, comprises a processor 86, a transmission apparatus communication processing sub-unit 88, an external monitoring apparatus communication processing sub-unit 90, an upper level communication processing module 94, an initialization processing module 96, a recording medium 122 and a lower level communication processing module 106. Unlike the second embodiment shown in FIG. 9, however, in the case of the fourth embodiment, the recording medium 122 is used for storing only communication controlling programs that are directly related to communication protocol conversion, that is the communication protocol identifying module 98, the communication protocol conversion data storing module 100, the communication protocol conversion controlling module 102 and the communication protocol converting module 104 as shown in FIG. 12. The processor 86, the transmission apparatus communication processing sub-unit 88, the external monitoring apparatus communication processing sub-unit 90, the upper level communication processing module 94, the initialization processing module 96, and the lower level communication processing module 96 have the same configurations as their counterparts employed in the communication protocol converting apparatus of the second embodiment shown in FIG. 9. The recording medium 122 is designed as a memory card implemented typically by a flash memory. The recording medium 122 is inserted into a card interface unit not shown in the figure in order to connect the recording medium 122 to the processor 86.

The recording medium 122 is inserted into a card interface unit not shown in the figure in order to connect the recording medium 122 to the processor 86 and communication controlling programs stored in the recording medium 122 are loaded into a main memory for execution. In addition, the recording medium 122 can be taken out from the card interface unit to be replaced by another recording medium 122 for storing new communication controlling programs capable of handling additional communication protocols. In this case, when the other recording medium 122 is inserted into the card interface unit and the processor 86 is started, the initialization processing module 96 loads the communication protocol identifying module 98, a communication controlling program stored in the recording medium 122, into the main memory.

The following is a description of the operation of the communication protocol converting apparatus 120, that is, the communication controlling apparatus implemented by the fourth embodiment of the present invention with reference to FIG. 12. Basically, the operation of the communication protocol converting apparatus 120 is the same as the communication protocol converting apparatus 82 of the second embodiment shown in FIG. 9 except that there are differences in interface (between the processor 86 and the recording medium) between the former and the latter. When the recording medium 122 is inserted into the card interface unit or when the communication apparatus 70 shown in FIG. 8 is started, the processor 86 is started and the initialization processing module 96 is activated to carry out processing such as initialization of the memory space. Then, the communication protocol identifying module 98 is loaded by the initialization processing module 96 into the main memory for execution. The communication protocol identifying module 98, the communication protocol conversion controlling module 100 and the communication protocol converting module 102 operate in the same way as their counterparts employed in the communication protocol converting apparatus 82 of the second embodiment shown in FIG. 9 respectively, transmitting an alarm notification/monitoring information or a result of processing completing communication protocol conversion in accordance with a communication protocol adopted by the external monitoring apparatus 84 to the external monitoring apparatus 84.

In addition, when a new communication protocol is introduced to the external monitoring apparatus 84, the communication protocol converting apparatus 120 allows the existing recording medium 122 to be taken out from the card interface unit to be replaced by a new recording medium 122 which keeps up with the new communication protocol.

When the processor 86 is started with the new recording medium 122 inserted into the card interface unit which serves as an interface between the recording medium 122 and the processor 86, the initialization processing module 96 is executed. The initialization processing module 96 in turn loads the communication protocol identifying module 98 from the inserted recording medium 122 into the main memory and activates the communication protocol identifying module 98. When the external monitoring apparatus 84 with a new communication protocol connected to the communication apparatus 70 through connectors is started, the communication protocol identifying module 98 identifies the communication protocol adopted by the external monitoring apparatus 84 and the communication protocol converting module 102 converts the communication protocol of an alarm notification/monitoring information or a result of processing into a communication protocol adopted by the external monitoring apparatus 84 prior to transmission of the alarm notification/monitoring information or the result of processing to the external monitoring apparatus 84. In this way, the communication protocol converting apparatus 120 is capable of keeping up with a new communication protocol adopted by the external communication apparatus 84 by merely replacing the existing recording medium 122 by another one for the new communication protocol without the need to restart the communication apparatus 70. As a result, the fourth embodiment described above provides the same effects as the third embodiment.

As described above, according to the present invention, the communication protocol adopted by a second apparatus 4 on the receiving side is identified and the communication protocol is converted into that adopted by the second apparatus 4 prior to transmission of a signal by a first apparatus 2 on the transmitting side to the second apparatus 4. As a result, it is no longer necessary to modify the second apparatus 4 even if the communication protocol of the first apparatus 2 is changed because the communication protocol is converted into that adopted by the second apparatus 4 anyway, allowing a flexible communication network to be built at a reasonable cost.

It should be noted that the description given so far is not intended to be construed in a limiting sense. That is to say, the present invention is not limited to the details of the preferred embodiments described above.

Instead, the scope of the present invention is defined by the following appended claims and all changes and modifications which fall within the equivalence of the scope of the claims are therefore to be embraced by the present invention.

What is claimed is:

1. A communication controlling apparatus provided between a first apparatus on a transmitting side originally designed for transmitting a first signal in accordance with a first communication protocol to a second apparatus on a receiving side for receiving a second signal in accordance with a second communication protocol and said second apparatus, wherein an acknowledgment response to said second signal is returned to said first apparatus if said second signal is received normally, and used for converting said first signal into said second signal conforming to said second communication protocol, said communication controlling apparatus comprising:

receiving side communication protocol identifying means for determining a candidate communication protocol for said second apparatus wherein, if an acknowledgment response to said second signal transmitted to said second apparatus is received from said second apparatus, a communication protocol used for transmission of said second signal to said second apparatus is determined to be a candidate communication protocol for said second apparatus and, if no acknowledgment response to said second signal transmitted to said second apparatus is received from said second apparatus, on the other hand, operations to convert said first signal into another signal conforming to another communication protocol supposed to be adopted by said second apparatus and to transmit said another signal to said second apparatus in accordance with said another communication protocol are repeated till an acknowledgment response to said another signal is received from said second apparatus in which case said another communication protocol is determined to be a candidate communication protocol for said second apparatus;

communication protocol converting means for converting said first signal into said another signal conforming to said another communication protocol supposed to be adopted by said second apparatus; and communication protocol conversion controlling means for controlling said communication protocol converting means wherein, if said first communication protocol is different from a communication protocol identified by said receiving side communication protocol identifing means, a command is given to said communication protocol converting means to convert said first signal into another signal conforming to said communication protocol identified by said receiving side communication protocol identifying means and, if said first communication protocol matches said communication protocol identified by said receiving side communication protocol identifying means, on the other hand, said first signal is passed on to said second apparatus as it is.

2. A communication controlling apparatus according to claim 1 wherein said communication controlling apparatus is embedded in said first apparatus and connected to said second apparatus by typically a cable and a connector that can be plugged in said second apparatus.

3. A communication controlling apparatus according to claim 1 wherein said communication controlling apparatus is connected t o said first apparatus and said second apparatus by typically a cable and connectors that can be plugged in said first and second apparatuses respectively.

4. A communication controlling apparatus according to claim 1 wherein said communication protocol conversion controlling means controls said communication protocol converting means to convert or not to convert said first signal into another signal conforming to another communication protocol supposed to be adopted by said second apparatus in dependence on a control signal.

5. A communication controlling apparatus according to claim 1 further comprising transmitting side communication protocol identifying means for identifying a communication protocol adopted by said first apparatus on said transmitting side; and wherein said communication protocol converting means is used for converting a communication protocol supposed to be adopted by any first apparatus on said transmitting side into a communication protocol supposed to be adopted by any second apparatus on said receiving side.

6. A communication controlling apparatus according to claim 1 further comprising an insert window for inserting a recording medium from a position outside said communication controlling apparatus and a processor;

wherein functions of said receiving side communication protocol identifying means, said communication protocol converting means and said communication protocol conversion controlling means are implemented by execution of a communication controlling program stored in said recording medium by means of said processor.

7. A communication controlling apparatus provided between a first apparatus on a transmitting side originally designed for transmitting a first signal in accordance with a first communication protocol to a second apparatus on a receiving side for receiving a second signal in accordance with a second communication protocol and said second apparatus, wherein an acknowledgment response to said second signal is returned to said first apparatus if said second signal is received normally, and used for converting said first signal into said second signal conforming to said second communication protocol, said communication controlling apparatus comprising:

receiving side communication protocol identifying means for determining a candidate communication protocol for said second apparatus by transmitting its own communication protocol identifying signal for identifying said communication protocol of said second apparatus to said second apparatus on its own initiative wherein, if an acknowledgment response to said communication protocol identifying signal transmitted to said second apparatus is received from said second apparatus, on the other hand, an operation to transmit another communication protocol identifying signal to said second apparatus is repeated till an acknowledgment response to said another communication protocol identifying signal is received from said second apparatus in which case said communication protocol used for transmission of said another communication protocol identifying signal to said second apparatus is determined to be a candidate communication protocol for said second apparatus;

communication protocol converting means for converting said first signal into said another signal conforming to said another communication protocol supposed to be adopted by said second apparatus; and communication protocol conversion controlling means for controlling said communication protocol converting means wherein, if said first communication protocol is different from a communication protocol identified by said receiving side communication protocol identifying means, a command is given to said communication protocol converting means to convert said first signal into another signal conforming to said communication protocol identified by said receiving side communication protocol identifying means and, if said first communication protocol matches said communication protocol identified by said receiving side communication protocol identifying means, on the other hand, said first signal is passed on to said second apparatus as it is.

8. A communication controlling apparatus according to claim 7 wherein said communication controlling apparatus is embedded in said first apparatus and connected to said second apparatus by typically a cable and a connector that can be plugged in said second apparatus.

9. A communication controlling apparatus according to claim 7 wherein said communication controlling apparatus is connected to said first apparatus and said second apparatus by typically a cable and connectors that can be plugged in said first and second apparatuses respectively.

10. A communication controlling apparatus according to claim 7 wherein said communication protocol conversion controlling means controls said communication protocol converting means to convert or not to convert said first signal into another signal conforming to another communication protocol supposed to be adopted by said second apparatus in dependence on a control signal.

11. A communication controlling apparatus according to claim 7 further comprising transmitting side communication protocol identifying means for identifying a communication protocol adopted by said first apparatus on said transmitting side; and wherein said communication protocol converting means is used for converting a communication protocol supposed to be adopted by any first apparatus on said transmitting side into a communication protocol supposed to be adopted by any second apparatus on said receiving side.

12. A communication controlling apparatus according to claim 7 further comprising an insert window for inserting a recording medium from a position outside said communication controlling apparatus and a processor;

wherein functions of said receiving side communication protocol identifying means, said communication protocol converting means and said communication protocol conversion controlling means are implemented by execution of a communication controlling program stored in said recording medium by means of said processor.

13. A recording medium used for storing a communication controlling program for controlling communication between a first app on a transmitting side originally designed for transmitting a first signal in accordance with a first communication protocol to a second apparatus on a receiving side for receiving a second signal in accordance with a second communication protocol and said second apparatus, wherein an acknowledgment response to said second signal is returned to said first apparatus if said second signal is received normally, and used for converting said first signal into said second signal conforming to said second communication protocol, said communication controlling program executed by a processor for implementing functions of:

receiving side communication protocol identifying means for determining a candidate communication protocol for said second apparatus wherein, if an acknowledgment response to said second signal transmitted to said second apparatus is received from said second apparatus, a communication protocol used for transmission of said second signal to said second apparatus is determined to be a candidate communication protocol for said second apparatus and, if no acknowledgment response to said second signal transmitted to said second apparatus is received from said second apparatus, on the other hand, operations to convert said first signal into another signal conforming to another communication protocol supposed to be adopted by said second apparatus and to transmit said another signal to said second apparatus in accordance with said another communication protocol are repeated till an acknowledgment response to said another signal is received from said second apparatus in which case said other communication protocol is determined to be a candidate communication protocol for said second apparatus;

communication protocol converting means for converting said first signal into said another signal conforming to said another communication protocol supposed to be adopted by said second apparatus; and communication protocol conversion controlling means for controlling said communication protocol converting means wherein, if said first communication protocol is different from a communication protocol identified by said receiving side communication protocol identifing means, a command is given to said communication protocol converting means to convert said first signal into another signal conforming to said communication protocol identified by said receiving side communication protocol identifying means and, if said first communication protocol matches said communication protocol identified by said receiving side communication protocol identifying means, on the other hand, said first signal is passed on to said second apparatus as it is.

14. A recording medium used for storing a communication controlling program for controlling communication between a first apparatus on a transmitting side originally designed for transmitting a first signal in accordance with a first communication protocol to a second apparatus on a receiving side for receiving a second signal in accordance with a second communication protocol and said second apparatus, wherein an acknowledgment response to said second signal is returned to said first apparatus if said second signal is received normally, and used for converting said first signal into said second signal conforming to said second communication protocol, said communication controlling program executed by a processor for implementing functions of:

receiving side communication protocol identifying means for determining a candidate communication protocol for said second apparatus by transmitting its own communication protocol identifying signal for identifying said communication protocol of said second apparatus to said second apparatus on its own initiative wherein, if an acknowledgment response to said communication protocol identifying signal transmitted to said second apparatus is received from said second apparatus, a communication protocol used for transmission of said communication protocol identifying signal to said second apparatus is determined to be a candidate communication protocol for said second apparatus and, if no acknowledgment response to said communication protocol identifying signal transmitted to said second apparatus is received from said second apparatus, on the other hand, an operation to transmit another communication protocol identifying signal to said second apparatus is repeated till an acknowledgment response to said another communication protocol identifying signal is received from said second apparatus in which case said communication protocol used for transmission of said another communication protocol identifying signal to said second apparatus is determined to be a candidate communication protocol for said second apparatus;

communication protocol converting means for converting said first signal into said another signal conforming to said another communication protocol supposed to be adopted by said second apparatus; and communication protocol conversion controlling means for controlling said communication protocol converting means wherein, if said first communication protocol is different from a communication protocol identified by said receiving side communication protocol identifying means, a command is given to said communication protocol converting means to convert said first signal into another signal conforming to said communication protocol identified by said receiving side communication protocol identifying means and, if said first communication protocol matches said communication protocol identified by said receiving side communication protocol identifying means, on the other hand, said first signal is passed on to said second apparatus as it is.

\* \* \* \* \*